US012651081B2

(12) United States Patent
Soffer et al.

(10) Patent No.: US 12,651,081 B2
(45) Date of Patent: Jun. 9, 2026

(54) SYSTEM AND METHOD FOR SECURE COPY-AND-PASTE OPERATIONS BETWEEN HOSTS THROUGH A PERIPHERAL SHARING DEVICE

(71) Applicant: HIGH SEC LABS LTD., Caesarea (IL)

(72) Inventors: Aviv Soffer, Caesarea (IL); David Hirshberg, Caesarea (IL)

(73) Assignee: HIGH SEC LABS LTD., Caesarea (IL)

( * ) Notice: Subject to any disclaimer, the term of this patent is extended or adjusted under 35 U.S.C. 154(b) by 17 days.

(21) Appl. No.: 18/721,239

(22) PCT Filed: Dec. 22, 2022

(86) PCT No.: PCT/IB2022/062662
§ 371 (c)(1),
(2) Date: Jun. 18, 2024

(87) PCT Pub. No.: WO2023/135477
PCT Pub. Date: Jul. 20, 2023

(65) Prior Publication Data
US 2025/0053669 A1 Feb. 13, 2025

Related U.S. Application Data

(60) Provisional application No. 63/299,031, filed on Jan. 13, 2022.

(51) Int. Cl.
*G06F 21/60* (2013.01)
*G06F 9/54* (2006.01)
(Continued)

(52) U.S. Cl.
CPC ............ *G06F 21/606* (2013.01); *G06F 9/543* (2013.01); *G06F 21/55* (2013.01)

(58) Field of Classification Search
CPC ........ G06F 21/606; G06F 21/55; G06F 21/60; G06F 21/602; G06F 21/604; G06F 21/62; G06F 21/106; G06F 21/108; G06F 9/543
See application file for complete search history.

(56) References Cited

U.S. PATENT DOCUMENTS

| | | | | |
|---|---|---|---|---|
| 2014/0113550 A1* | 4/2014 | Li | ............ | H04L 67/06 455/41.1 |
| 2014/0267339 A1* | 9/2014 | Dowd | .............. | G06F 9/543 709/219 |

(Continued)

*Primary Examiner* — Edward Zee
(74) *Attorney, Agent, or Firm* — Daniel J. Swirsky; AlphaPatent Associates Ltd.

(57) ABSTRACT

A peripheral sharing device for supporting secure copy-paste operations between hosts comprising: a plurality of copy-emulators and a plurality of paste emulators, configured each to be connected to a copy-paste driver, wherein each copy-paste driver is running on one of a plurality of hosts that are connected to the peripheral sharing device, and the copy-paste driver is configured to fetch or store clipboard objects from the clipboard of the corresponding host, a security bridge that is configured to securely pass clipboard objects between pairs of copy emulator and paste emulator. The security bridge performs security operations, such as, enforce unidirectional data transfer of the clipboard object, monitor the clipboard object and enable or disable the copy-paste operation according to a set of security rules; enable or disable the copy-paste operation according to security policy, analyze clipboard object traffic to detect cybersecurity events, locking suspicious peripheral sharing devices, and preventing clipboard object transfer between pairs of copy-paste controllers according to security rules. The copy emulator receives the clipboard object from the copy-paste driver of a first host, transfer the clipboard object to the security bridge and conditioned upon passing the security conditions the security bridge transfer the clipboard (Continued)

object to the paste emulator that further pass the clipboard object to a second computer's copy-paste driver.

24 Claims, 9 Drawing Sheets

(51) Int. Cl.
     *G06F 21/00*      (2013.01)
     *G06F 21/55*      (2013.01)

(56)               References Cited

U.S. PATENT DOCUMENTS

2015/0326575 A1* 11/2015 Ramirez Flores .. H04L 63/0876
                                             726/5
2018/0039385 A1* 2/2018 Worley ................ G06F 3/0482

* cited by examiner

SYSTEM AND METHOD FOR SECURE COPY-AND-PASTE OPERATIONS BETWEEN HOSTS THROUGH A PERIPHERAL SHARING DEVICE

FIELD OF THE INVENTION

The present invention, in some embodiments thereof, relates to copy-and-paste operations between different host computers, and in specific to secure copy-and-paste operations between host computers using a peripheral sharing device that serves a plurality of host computers.

BACKGROUND OF THE INVENTION

Copy and paste options is well known operation in the context of a single host computer. The user may copy text, images, and in general, clipboard objects, between applications running simultaneously over the host computer. In the same way copy-and-paste operation may be done between applications running on different host computers. There are several ways known in the art to accomplish this task. If the computers are already connected to each other, e.g., they are both connected to the Internet, a software solution like a remote terminal can be used. If the computers are not connected a combination of software and hardware, e.g., serial cable or USB cable can be used.

In some cases, the user may use peripheral sharing device to share one or more peripheral devices with a plurality of host computers the user is working with. A common peripheral sharing device is KVM switch that allows the user to switch a set of keyboard, mouse and display between different hosts. Note that, although in general, a peripheral sharing device is connected to multiple hosts, this connection on its own do not enable communication between the different hosts to allow inter-host, i.e., between hosts, copy-paste operations. Moreover, in secure peripheral sharing device, the separation and isolation between the hosts is a mandatory feature. Secure peripheral sharing device is used to reduce as much as possible the risk from cyber-security attacks that exploit weaknesses in the peripheral sharing device separation and isolation. The secure peripheral sharing device contains functions and features that block some known security issues that can be exploited in a non-secure peripheral sharing device. The objective of the present invention is to provide secure inter-host copy-paste operation between hosts that share one or more peripheral devices by a peripheral sharing device.

SUMMARY OF THE INVENTION

The present invention relates to copy-and-paste operations between different host computers, and in specific to secure copy-and-paste operations between host computers using the same peripheral sharing device.

According to an aspect of some embodiments of the present invention there is provided a peripheral sharing device for supporting secure copy-paste operations between hosts, comprising:

a plurality of copy-emulators and a plurality of paste emulators, configured each to be connected to a copy-paste driver, wherein each copy-paste driver is running on one of a plurality of hosts that are connected to the peripheral sharing device, and the copy-paste driver is configured to fetch or store clipboard objects from the clipboard of the corresponding host, a security bridge that is configured to securely pass clipboard objects between pairs of copy emulator and paste emulator, wherein the security bridge performs at least one of or any combination of:

(1) enforcing unidirectional data transfer of the clipboard object;

(2) monitoring the clipboard object and enabling or disabling the copy-paste operation according to a security policy or a set of security rules;

(3) enabling or disabling the copy-paste operation according to security policy comprising from at least the identity of source host, the identity of the target host, the type of the clipboard object, time delays and time of day of the copy-paste operation;

(4) modifying the clipboard object to prevent sensitive data leakage;

(5) building a profile of copy-paste operation patterns of users;

(6) analyzing clipboard object traffic to detect cyber-security events;

(7) logging, auditing and archiving copy-paste operation or clipboard object traffic history;

(8) scanning virus existence in clipboard object;

(9) sanitizing or removing some information from clipboard objects;

(8) encrypting and decrypting of dipboard objects;

(9) locking suspicious peripheral sharing devices; and

(10) preventing clipboard object transfer between pairs of copy-paste controllers according to security rules, and wherein the copy emulator receives the clipboard object from the copy-paste driver of a first host, transfer the clipboard object to the security bridge and conditioned upon passing the security conditions the security bridge transfer the clipboard object to the paste emulator that further pass the clipboard object to a second host's copy-paste driver.

According to some embodiments of the invention, the security bridge is further configured to perform security functions from at least one of or any combination of:

(1) enforcing unidirectional communication between pairs of copy-and-paste controllers;

(2) authenticating the pairs of copy-and-paste controllers;

(3) blocking or filtering out undesired data transmission between the pairs of copy-and-paste controllers;

(4) blocking, locking, neutralizing or stopping the communication between the pairs of copy-and-paste controllers;

(5) encrypting and decrypting the communication between the pairs of copy-and-paste controllers;

(6) logging, auditing or alerting copy-and-paste clipboard transfer events;

(7) auditing the clipboard context of clipboard transfer events;

(8) analyzing the context of clipboard transfer events;

(9) preventing data transfer between pairs of copy-and-paste controllers according to security rules;

(10) preventing signal leakage between copy-and-paste controllers;

(11) allowing passage of only specific types of clipboard object types;

(12) scanning for viruses and malicious codes in files/objects dipboards;

(13) isolating the communication between pairs of copy-paste controllers;

(14) allowing only very specific copy-and-paste usage;

(15) using AI processing to detect suspicious pattern of copy-paste operations.

According to some embodiments of the invention, the clipboard object received by the target host is modified version of the clipboard object transferred by the source host.

According to some embodiments of the invention, the security bridge further comprises an external/remote security agent attached to the peripheral sharing device and the external/remote security agent is a local external device connected to the peripheral sharing device or a remote device or server connected to the peripheral sharing device using a data network comprising from at least an intranet or the Internet.

According to some embodiments of the invention, the peripheral sharing device is configured to communicate with the external/remote security agent via one or more Ethernet ports.

According to some embodiments of the invention, the communication with the external/remote security agent is performed using VPN or IPSEC tunneling protocols.

According to some embodiments of the invention, the security bridge is comprising a copy controller communicating with the one or more copy emulators and a paste controller communicating with the one or more paste emulators.

According to some embodiments of the invention, the peripheral sharing device comprises at least one unidirectional enforcing device that enable only copy operations and block all paste operations from a particular host.

According to some embodiments of the invention, the peripheral sharing device comprises at least one unidirectional enforcing device that enable only paste operations and block all copy operations from a particular host.

According to some embodiments of the invention, the peripheral sharing device comprises one or more memories to store the clipboard objects, and the memories are at least any one of or any combination of: internal memories, add-on memories, external storage devices, volatile memories, non-volatile memories.

According to some embodiments of the invention, the peripheral sharing device comprises user interface means to trigger and control the copy-paste operations.

According to some embodiments of the invention, the peripheral sharing device is a secure peripheral sharing device.

According to some embodiments of the invention, the communication between the copy-paste driver and the copy emulator is performed over USB.

According to some embodiments of the invention, the communication between the copy-paste driver and the paste emulator is performed over USB.

According to some embodiments of the invention, keyboard and mouse device emulator, copy emulator, and paste emulator, share the same USB port and enumerate as a plurality of composite USB devices.

According to some embodiments of the invention, the peripheral sharing device further comprises network switches to share data communication of the hosts and the security bridge over one or more external network ports.

According to some embodiments of the invention, the clipboard object comprises at least from any one of: text string, picture, file, and OLE objects.

According to some embodiments of the invention, the peripheral sharing device add metadata information to the clipboard object and wherein the metadata information comprises at least one of or any combination of: TOD of the copy operation, copy operation host ID, TOD of the paste operation, paste operation host ID.

According to some embodiments of the invention, the peripheral sharing device comprises copy-paste User Interface (UI), the copy-paste user interface comprises at least one of or any combination of (1) pushbuttons to trigger the copy-paste operations or steps of the copy-paste operations, and (2) indicators to provide progress and status information to the user regarding the copy-paste operation.

According to some embodiments of the invention, the peripheral sharing device capture copy-paste triggering commands from the keyboard data stream.

According to some embodiments of the invention, the peripheral sharing device receives copy-paste triggering commands from the copy-paste device driver.

According to some embodiments of the invention, only text string clipboard objects, with length that is less than a predefined maximum length, are allowed to be transferred in the copy-paste operations.

According to an aspect of some embodiments of the present invention, there is provided a system for secure copy-and-paste operations between hosts, comprising:

A plurality of hosts; and

A secure copy-paste peripheral sharing device for supporting secure copy-paste operations between hosts, Each host is connected to the secure copy-paste peripheral sharing device and comprises copy-paste driver configured to fetch or store clipboard objects from the clipboard of the host The secure copy-paste peripheral sharing device, comprising:

a plurality of copy-emulators and a plurality of paste emulators, configured each to be connected to one of the copy-paste drivers, a security bridge that is configured to securely pass clipboard objects between pairs of copy emulator and paste emulator, wherein the security bridge performs at least one of or any combination of:

(1) enforcing unidirectional data transfer of the clipboard object;

(2) monitoring the clipboard object and enabling or disabling the copy-paste operation according to a security policy or a set of security rules;

(3) enabling or disabling the copy-paste operation according to security policy comprising from at least the identity of source host, the identity of the target host, the type of the clipboard object, time delays and time of day of the copy-paste operation;

(4) modifying the clipboard object to prevent sensitive data leakage;

(5) building a profile of copy-paste operation patterns of users;

(6) analyzing clipboard object traffic to detect cybersecurity events;

(7) logging, auditing and archiving copy-paste operation or clipboard object traffic history;

(8) scanning virus existence in clipboard object;

(9) sanitizing or remove some information from clipboard objects;

(8) encrypting and decrypting of clipboard objects;

(9) locking suspicious peripheral sharing devices; and

(10) preventing clipboard object transfer between pairs of copy-paste controllers according to security rules, and wherein the copy emulator receives the clipboard object from the copy-paste driver of a first host, transfer the clipboard object to the security bridge and conditioned upon passing the security conditions, the security bridge transfer the clipboard object to the paste emulator that further pass the clipboard object to a second host's copy-paste driver.

According to an aspect of some embodiments of the present invention, a method for performing secure copy-and-paste operations between hosts through a peripheral sharing device that is attached to the hosts, the method comprising the steps of:

receiving a clipboard object from a source host;

transferring the clipboard to a security bridge;

receiving the dipboard from the security bridge; and sending the clipboard to the target host, wherein the security bridge performs at least one of or any combination of:

(1) enforcing unidirectional data transfer of the clipboard object;

(2) monitoring the clipboard object and enabling or disabling the copy-paste operation according to a security policy or a set of security rules;

(3) enabling or disabling the copy-paste operation according to security policy comprising from at least the identity of source host, the identity of the target host, the type of the clipboard object, time delays and time of day of the copy-paste operation;

(4) modifying the clipboard object to prevent sensitive data leakage;

(5) building a profile of copy-paste operation patterns of users;

(6) analyzing clipboard object traffic to detect cyber-security events;

(7) logging, auditing and archiving copy-paste operation or clipboard object traffic history;

(8) scanning virus existence in clipboard object;

(9) sanitizing or removing some information from clipboard objects;

(8) encrypting and decrypting of clipboard objects;

(9) locking suspicious peripheral sharing devices; and

(10) preventing clipboard object transfer between pairs of copy-paste controller according to security rules.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, software, firmware, the operating system or by a combination thereof.

For example, hardware for performing selected tasks according to embodiments of the invention could be implemented as a chip or a circuit As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1 is a schematic view of a peripheral sharing device system in accordance with the present invention;

FIG. 2 is a schematic view of a more general peripheral sharing device system in accordance with the present invention;

FIG. 3 is a schematic view of a peripheral sharing device integrating a secure copy-paste subsystem in accordance with the present invention;

FIG. 4 is a schematic view of another embodiment of a peripheral sharing device integrating a secure copy-paste subsystem in accordance with the present invention;

FIG. 5 is a schematic view of yet another embodiment of a peripheral sharing device integrating a secure copy-paste subsystem in accordance with the present invention;

FIG. 6 is a schematic view of the network connections to the peripheral sharing device of FIG. 4;

FIG. 7 is a schematic view of an embodiment of peripheral sharing device that requires reduced number of network ports in accordance with some embodiments of the present invention;

FIG. 8 is a front panel view of an embodiment of peripheral sharing device showing a user interface in accordance with some embodiments of the present invention; and FIG. 9 is a front panel view of another embodiment of peripheral sharing device showing another user interface in accordance with some embodiments of the present invention.

DETAILED DESCRIPTION OF THE INVENTION

Figure 3:
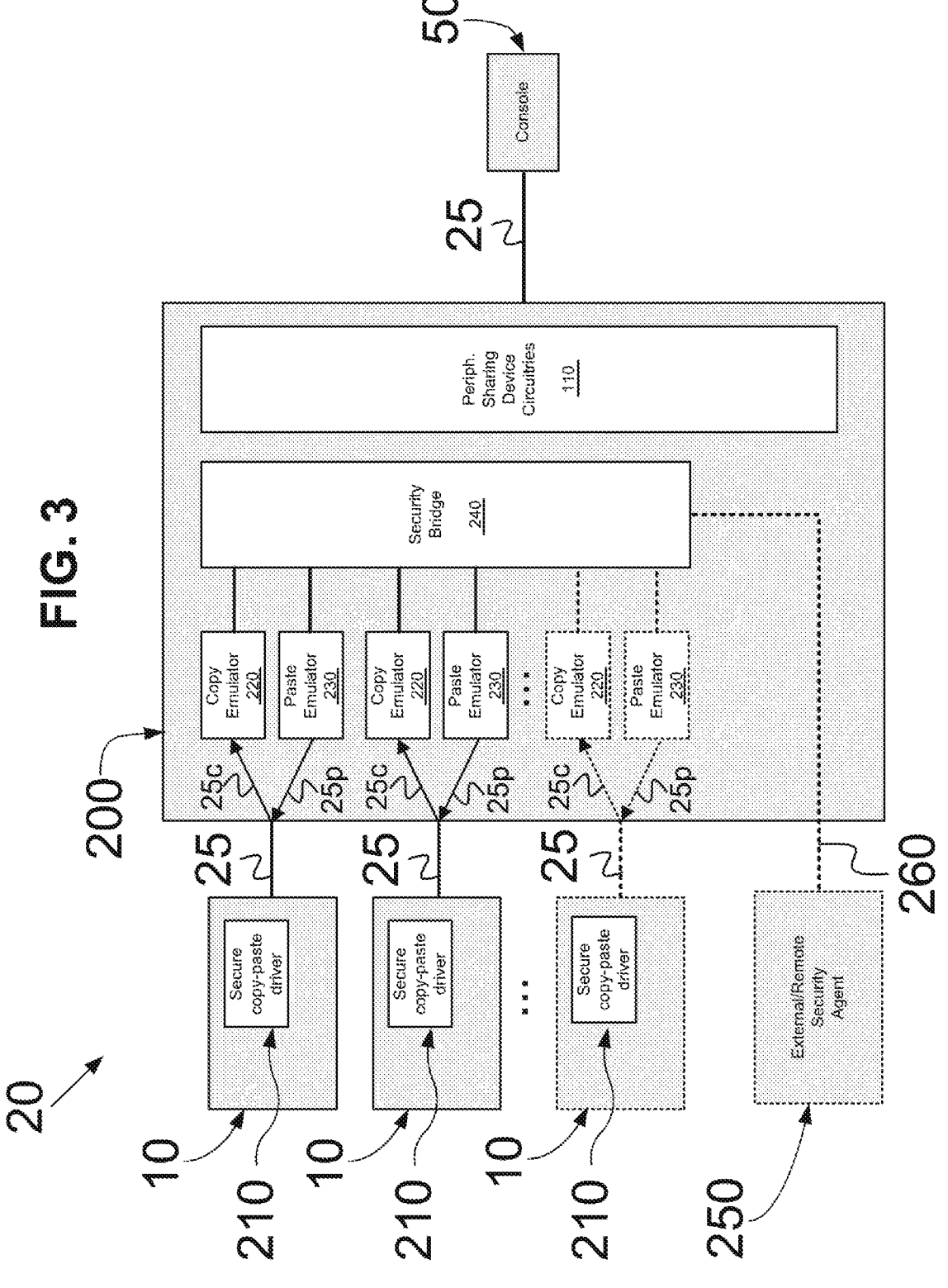

The present invention, in some embodiments thereof, relates to copy-and-paste operations between different host computers, and in specific to secure copy-and-paste operations between host computers using a peripheral sharing device.

A peripheral sharing device is a device that couples between host computers and a console comprising one or more peripheral devices. The host may be a computer, a workstation, or any other computing device that is configured to be connected to one or more peripheral devices. Peripheral sharing devices are used for sharing the one or more peripheral devices capabilities, functions or services between the plurality of hosts. The sharing may be done by switching, i.e., coupling, at a given time frame, between a single set of peripheral and a single host, and coupling, by a switch, to different host at other time frames. Alternatively, the sharing may be done by allowing simultaneous coupling of a set of peripheral devices to a plurality of hosts. For example, a keyboard peripheral device is typically works at a given time with a single host, hence the sharing device is typically a switch device. In another example, a smart card reader device may be connected through a peripheral sharing device that keep authentication sessions with several hosts simultaneously. In this case the sharing device provides simultaneous sharing services. A very common popular peripheral sharing device is a KVM switch that enable a user with a set of a keyboard (K), a display (V) and a mouse (M) to be shared and operate two or more host computers.

Figure 1:
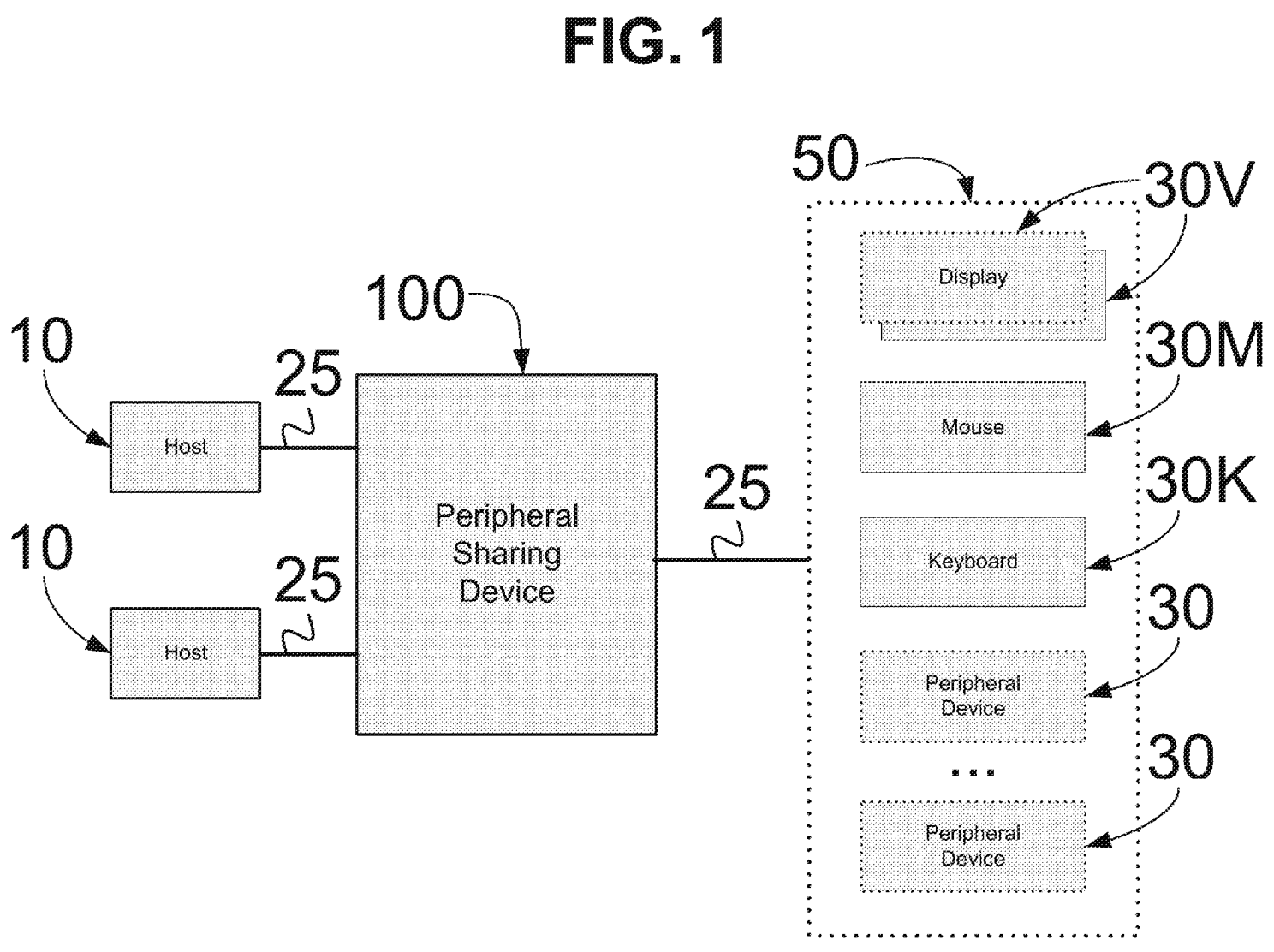

Referring now to the drawings, FIG. 1 illustrates a high-level schematic diagram of a peripheral sharing device system that couples between one or more peripheral devices, deployed in a single console 50, and two hosts 10. As used herein, the term "host computer", or, in short, "host", means a computer, a workstation, or any computing device configured to be connected to one or more peripheral devices.

The data transfer between host 10 and console 50 is carried by one or more peripheral devices communication protocols 25. The types and the number of peripheral devices communication protocols 25 are depended on the console's 50 peripheral devices.

Peripheral sharing device 100 comprises two types of ports that are configured to be connected to peripheral devices communication protocols 25: (1) host side ports, that are configured to be connected to host 10 via peripheral devices communication protocols 25, and (2) console side ports, that are configured to be connected to peripheral devices 30 via peripheral devices communication protocols 25.

Peripheral devices communication protocols 25 may be parallel buses, serial buses, Universal Serial Bus (USB), and many other types of communication protocols, such as, SPI, I2C, CAN bus, SCSI, Fiber Channel (FC), IDE, ATA, PCI, PCI-x, IEEE 1394 (Firewire), Ethernet, Thunderbolt, Infini-Band and the like. For the video data, peripheral devices communication protocols 25 may be VGA, DVI, HDMI, DP and the like. In an exemplary embodiment of the invention, peripheral devices communication protocols 25 may be wireless protocols such as Wi-Fi, Bluetooth, Zigbee and the like.

As user herein, the term "peripheral devices communication protocol" means any communication media or communication protocol that are able to couple between a host and a peripheral device. The term may be used for a class of instances, as well as, the actual instances. The present invention is not limited to the types of peripheral devices communication protocols described herein above, and modifications and variations to support new versions, revisions, as well as other types, including new types, of peripheral devices communication protocols will be apparent to those skilled in the art.

Peripheral sharing device 100 may be used for switching between two hosts 10 and a console comprising: a keyboard 30K, a mouse 30M and one or more displays 30V. This is known as a two ports KVM switch device. Peripheral devices 30 of console 50 may further include printers, cameras, microphones, speakers, smart card readers, biometric identification devices, external mass storage devices, USB dongles, mobile terminals such as smartphones and the like.

As used herein, the term "console" means a collection (set) of peripheral devices 30, such as, keyboard 30K, mouse 30M and one or more displays 30V. The peripheral devices are used by a user to interact with host 10. The peripheral devices 30, 30K, 30M, 30V of console 50 typically reside on the user's desktop or in a close proximity to the user, e.g., in the user's office.

Figure 2:
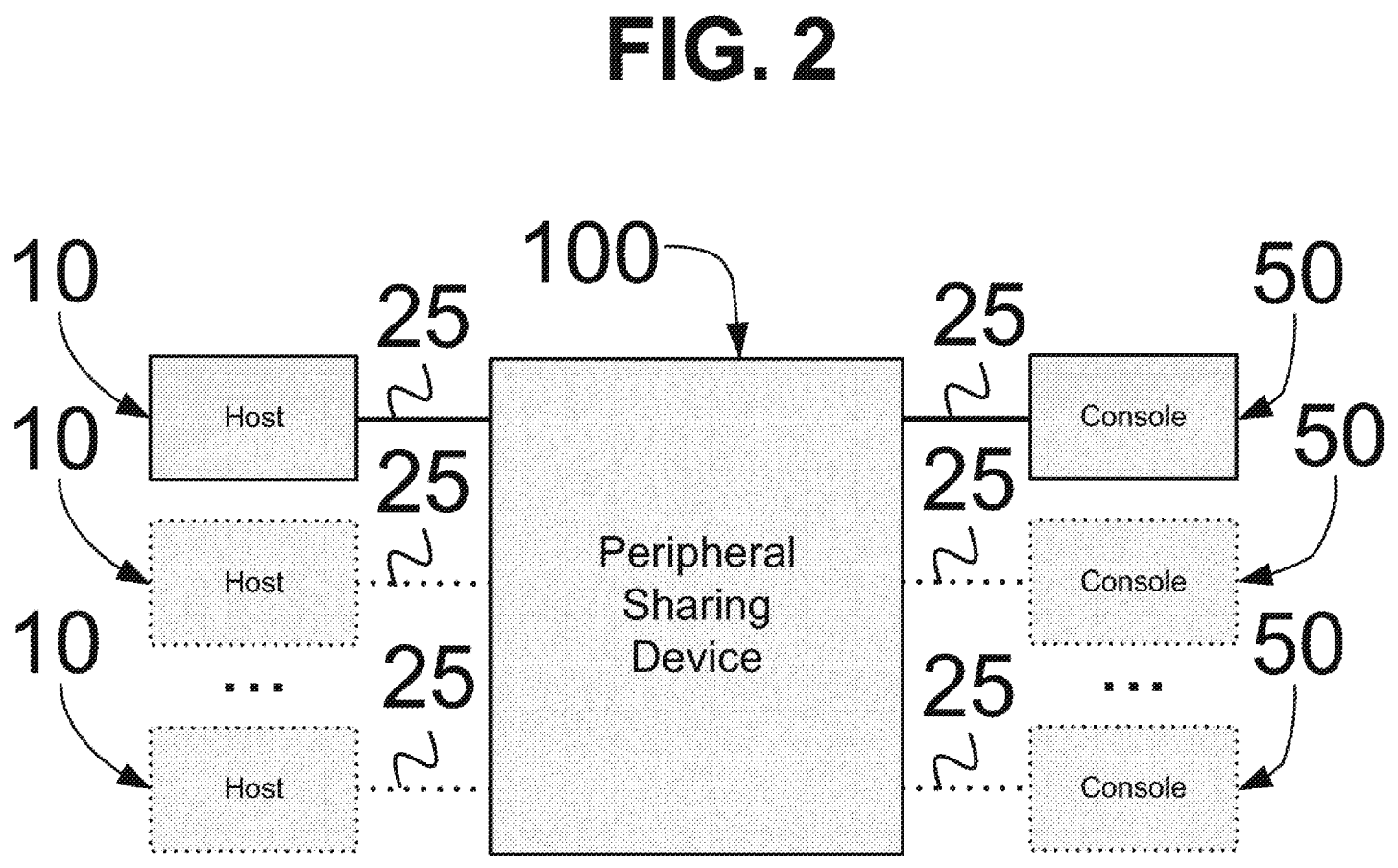

Reference is now made to FIG. 2. FIG. 2 illustrates a schematic diagram of a peripheral sharing device system that couple between a plurality of hosts 10 and a plurality of consoles 50, each may contain an identical or a different set of peripheral devices.

Console 50 peripheral devices are coupled to host 10 using peripheral devices communication protocols 25. Peripheral devices communication protocols 25 may be a single communication protocol that aggregate all data transfers for the plurality of peripheral devices 30, 30K, 30M, 30V of console 50 or a plurality of peripheral devices communication protocols 25, each provides a data transfer between host and a single peripheral device or a subset of all peripheral devices in console 50.

Peripheral sharing device 100 may convert and/or aggregate the peripheral devices communication protocols 25 between the host side and the console side. For example, keyboard 30K and mouse 30M may be connected to peripheral sharing device 100 each by a single USB peripheral devices communication protocol 25 and peripheral sharing device 100 may aggregate these two peripheral devices to one composite USB device, so that a single USB peripheral devices communication protocol 25 is used to connect peripheral sharing device 100 to host 10.

Console 50 may include a display 30V, or a plurality of displays 30V.

The configuration wherein a multiple of users using multiple consoles can be coupled to a farm of host computers often referred as a peripheral device matrix, e.g., KVM matrix. The KVM matrix may be implemented by a plurality of coupled components that are enclosed separately and may be in proximity to each other or far apart from each other.

In the embodiments illustrated in FIGS. 1 and FIG. 2, peripheral sharing device 100 has been implemented in a single enclosure. Alternatively, peripheral sharing device 100 may be implemented by a plurality of coupled components that are enclosed separately and may be in proximity to each other or far apart from each other.

As used herein, the term "peripheral sharing device" means any device that is coupled to a plurality of host computers from one side and coupled to one or more peripherals device located within on or more consoles from the other side. The peripheral sharing device provides a sharing of at least one peripheral device between two or more host computers.

Copy-and-paste operation is a well-known operation in the context of a single host computer. The user may select a text, file, or any other data object, hereinafter copy-paste object or clipboard object or for brevity an object, and transfer it between applications or folders within the host computer system. To support this operation, the host's operating system comprises an object known as the "clipboard". The clipboard contains the information that is to be copied between the applications or folders. A software element on the computer, e.g., an application or a software device driver may send a copy-and-paste object to the clipboard. Any application or a software device driver that registered or signed up to the clipboard services may be notified on the existence of new content on the clipboard and can copy the clipboard content.

As used herein copy-and-paste operation may also be referred to cut-and-paste operation where the copied object is removed or deleted from the host after the copy operation. For brevity, copy-and-paste (as well as cut-and-paste) in this document may also refer, by discarding the -and-, as copy-paste operation.

The copy-paste operation is triggered in the art be several UI means. An exemplary UI operation is the following: (a) user selects the text/object she wants to transfer, (b) user presses Control-C on the keyboard, (c) user selects the target location, (d) user presses Control-V on the keyboard.

The copy-paste operation was extended in the art to situations where a single user works with multiple host computers and transfer the clipboard content between the different hosts. If the host computers can communicate between themselves, e.g., they both connected to the Internet or reside on the same local area network (LAN), extending the copy-paste operation between the hosts may involve using a software solution, for example using remote terminal application. If the host computers are not connected and cannot communicate between themselves, one can directly connect a communication link between the hosts using for example crossover serial RS232 cable, USB cable or the like and with a proper software make copy-paste operations between the hosts. However, such a solution needs additional hardware and software and impose cyber-security risks.

In the situation where the hosts are isolated from each other from security reasons and cybersecurity policy is enforced such connection is not allowed and copy-paste operation is not feasible between the computer. Note that in this case the user can still share the peripheral devices in his console using a secure peripheral sharing device. Such peripheral sharing device that can share the peripheral devices while keep the host isolated and still robust to cyber-security attacks is known in the art as secure peripheral sharing device. A common secure peripheral sharing device is a secure KVM switch.

Some methods and architectures that provide secure peripheral sharing devices can be found in U.S. Pat. Nos. 8,769,172, 9,501,157, 9,542,006, and 9,286,460. In many cases secure peripheral sharing devices are certified by certification bodies such as the National Information Assurance Partnership (NIAP). Information on NIAP certification for secure peripheral sharing device may be found in Internet domain: www.niap-ccevs.org.

The objective of this invention is to allow copy-paste operation between isolated host computers by the user using peripheral sharing device. The teaching of the methods and apparatuses for secure cut-and-paste in this application is not limited to secure peripheral sharing devices and may be embodied in non-secure peripheral sharing device too. However, the teaching of this invention in the presence of secure peripheral sharing device open a secured way to perform cut-and-paste operations between isolated hosts that was not been able to be performed otherwise before.

As used herein the term "intra-computer" means within the host computer. Intra-computer copy-paste operation means copy-paste operation performed between applications running on the same host computer.

As used herein the term "inter-computer" means between different host computer. Inter-computer copy-paste operation means copy-paste operation performed between applications running on different host computers.

As used herein the term "source host" means the host that executed the copy operation and the term "target host means the host that executed the paste operation.

In the following paragraphs the motivation and use cases for the present invention are provided. In an exemplary scenario, a user having a KVM switch is operating two host computers, one is non classified, connected to the Internet, while the other computer is classified connected to internal classified network of a classified organization. In the first use case, the user is an analyst aimed to generate a classified top-secret report that contains secret information but also contains some information that is collected from the Internet. Using the secure copy-paste operation the user can fetch data from the internet, select the desired unclassified data and by secure copy-paste operation embed it in the top-secret report. In a second use case, the user writes unclassified report that contains unclassified data that resides on the classified network. With a proper policy, restriction and monitoring such operation may be performed easily as well by a trusted user. In another use case, the user needs to transfer a file to $3^{rd}$ party contractor located outside the organization. With a roper security checking, such file can be copy-pasted between the classified computer to the non-classified computer and sent by the e-mail (running on the non-classified computer) to the $3^{rd}$ party contractor.

Reference is now made to FIG. 3. FIG. 3 is a schematic view of a secure copy-and-paste system that performs secure copy-and-paste operations between host through a peripheral sharing device in accordance with the present invention. Secure copy-paste peripheral sharing device 200 internal circuitries 110 is similar to peripheral sharing device 100. The elements, circuitries and connections between internal circuitries 110, hosts 10 and console 25 are not shown in FIG. 3 for the sake of clarity and brevity. It should be noted that internal circuitries 110 may be different between different types of peripheral sharing device 100 such as switches versus matrixes, non-secure versus secure, and the like. The architecture, coupling and operation of the peripheral sharing device with the hosts 10 and console 50 (or consoles 50) using peripheral devices communication protocols 25 is as described by the text description of FIG. 1 and FIG. 2.

In addition to the peripheral sharing internal circuitries 110, secure copy-paste peripheral sharing device 200 comprises copy emulators 220, paste emulators 230, security bridge 240, external/remote security agent 250, and, optionally, communication link 260 to external/remote security agent 250. Peripheral sharing internal circuitries 110 may communicate or interact with elements 220, 230 and 240.

In addition to elements 220, 230 and 240 that reside in secure copy-paste peripheral sharing device 200, the copy-paste system 20 comprises secure copy-paste device drivers 210. As used herein, secure copy-paste device driver will also refer, for brevity, as copy-paste driver. Copy-paste driver 210 is a software element running on host computer 10 and registered or signed in to the clipboard element which is typically part of the host's 10 operating system. Whenever any application transmits a copy-paste object to the clipboard, the clipboard notifies secure copy-paste driver 210 of the existence of the copy-paste object in the clipboard. Copy-paste driver 210 may send the copy-paste object to the matching copy emulator 220. From the point of view of the host 10, copy-paste driver 210 together with the copy emulator 220 serve as a standard software element, e.g., an application, that interacts with the host clipboard. The data transfer is done over peripheral devices communication protocols 25*c*. Communication protocol 25*c* may be aggregated over a protocol that already been used by peripheral sharing internal circuitries 110 or may be an independent communication protocol dedicated to communication between copy-paste driver 210 and copy emulator 220. For example, if host 10 is connected to peripheral sharing internal circuitries 110 via USB protocol for keyboard and mouse communication, on the same USB bus by sharing the same connectors and cable, another composite USB device may be used for communication protocol 25*c*. In an exemplary embodiment of the invention, this composite USB device may comply with the USB communications device class (USB CDC class) specifications.

The copy emulator 220 may store the clipboard object, i.e., the copy-paste object, in internal or external memory. For example, external memory may be a USB storage dongle device. The copy emulator may transfer the copy-paste object to the security bridge 240. Upon receiving the copy-paste object security bridge 240 may provide a variety of security operation that will be discussed later on, and upon decision to allow the copy-and-paste operation, security bridge 240 may transfer the copy-paste object to paste emulator 230 that match to the target host of the cut-and-paste operation. Security bridge 240 may store the copy-paste object in internal or external memory. Optionally, security bridge 240 may transfer the copy-paste object, as is; after processing; and/or with some additional metadata, to external/remote security agent 250 through communication link 260. Further description of external/remote security agent 250 will be provided later on. If the copy-and-paste operation is allowed, security bridge 240 will receive back the processed copy-paste object and then security bridge 240 may transfer the copy-paste object to paste emulator 230 that match to the target host for this cut-and-paste operation.

Whenever paste emulator 230 receives copy-paste object, it may transfer the copy-paste object to the secure copy-paste driver 210 of the matching host. Secure copy-paste driver 210 may transfer the received copy-paste object to the host's clipboard. At this time, upon the proper user interface command, e.g., CNTRL-V, the user may paste the clipboard content from the clipboard to the desired application. From the point of view of the host 10, copy-paste driver 210 together with the paste emulator 210 serve as a standard software element that provide clipboard objects to the host's clipboard.

While in some embodiment all secure functions of the copy-paste operation are done internally inside security bridge 240, it is advantageous, in some cases to do some of the security function in a remote central location. For example, communication link 260 may be network link that connects security bridge 240 to a server that act as an external/remote security agent 250.

External/remote security agent 250 may perform some additional security function such as: (a) virus scanning, in the case the copy-paste object is a file or potentially executable object, (b) sanitization, i.e., removing some information from the copy-paste object to reduce potential leak of hidden, innocent, non-relevant data or malicious embedding of data in the copy-paste object; and (c) logging, auditing and performing some deep artificial intelligence processing over the copy-paste operation history to identify suspicious or abused use of the copy-paste operations.

Sanitization may delete some metadata in files like the name of the author, creation date, version history or the like. Sanitization may also convert formats and make transformation on the data. For example, in some pdf or word documents with blacking out or deletion of text in a document, the blacking out of data might be exposed if the original file is transferred. To overcome this, sanitization may generate a printed version, then convert back the printed version to a pdf file. For pictures or video, the sanitization system may run a sequence of conversions including some blurring signal processing to ensure no hidden residual data may be transmitted over the clipboard object. Optionally, these conversions might involve conversion from digital domain to analog domain and back from the analog domain to the digital domain.

Copy-paste object may contain simple short characters string, e.g., text that may be processed by security bridge 240. Copy-paste object may contain more sophisticated object such as pictures, specific operating system complex object, such as, Microsoft OLE objects, and files. Security bridge 240 may filter out and not allow pasting of some types of objects or alternatively transfer some of the objects to external/remote security agent 250. Security bridge 240 may filter out and not allow pasting of some file types. The file type allowance policy may be stored in file type whitelist/blacklist tables.

In an exemplary embodiment of the invention, peripheral sharing device 200 support secure copy-paste operations between hosts. The secure copy-paste peripheral sharing device 200 comprises: (1) a plurality of copy-emulators and a plurality of paste emulators, configured each to be connected to a copy-paste driver, wherein each copy-paste driver is running on one of a plurality of hosts that are connected to the peripheral sharing device, and the copy-paste driver configured to fetch or store clipboard objects from the clipboard of the corresponding host, (2) a security bridge that is configured to securely pass clipboard contexts between pairs of copy emulator and paste emulator, wherein the copy emulator receives the clipboard object from the copy-paste driver of a first host, transfer the clipboard object to the security bridge and conditioned upon passing the security conditions the security bridge transfer the clipboard object to the paste emulator that further pass the clipboard object to a second computer's copy-paste driver.

The security bridge performs at least one of or any combination of:

(1) enforcing unidirectional data transfer of the clipboard object;

(2) monitoring the clipboard object and enabling or disabling the copy-paste operation according to a set of security rules;

(3) enabling or disabling the copy-paste operation according to security policy comprising from at least the identity of source host, the identity of the target host, the type of the clipboard object, and time of day of the copy-paste operation;

(4) modifying the clipboard object to prevent sensitive data leakage;

(5) building a profile of copy-paste operation patterns of users;

(6) analyzing clipboard object traffic to detect cybersecurity events;

(7) logging, auditing and archiving copy-paste operation or clipboard object traffic history;

(8) scanning virus existence in clipboard object;

(9) sanitizing or remove some information from clipboard objects;

(8) encrypting and decrypting of clipboard objects;

(9) locking suspicious peripheral sharing devices; and

(10) preventing clipboard object transfer between pairs of copy-paste controllers according to security rules, The security bridge is further configured to perform security functions from at least one of or any combination of:

(1) enforcing unidirectional communication between pairs of copy-and-paste controllers;

(2) authenticating the pairs of copy-and-paste controllers;

(3) blocking or filtering out undesired data transmission between the pairs of copy-and-paste controllers;

(4) blocking, locking, neutralizing or stopping the communication between the pairs of copy-and-paste controllers;

(5) encrypting and decrypting the communication between the pairs of copy-and-paste controllers;

(6) logging, auditing or alerting copy-and-paste clipboard transfer events;

(7) auditing the clipboard context of clipboard transfer events;

(8) analyzing the context of clipboard transfer events;

(9) preventing data transfer between pairs of copy-and-paste controllers according to security rules;

(10) preventing signal leakage between copy-and-paste controllers;

(11) allowing passage of only specific types of clipboard object types;

(12) scanning for viruses and malicious codes in files/objects clipboards;

(13) isolating the communication between pairs of copy-paste controllers;

(14) allowing only very specific copy-and-paste usage;

(15) using AI processing to detect suspicious pattern of copy-paste operations.

Figure 4:
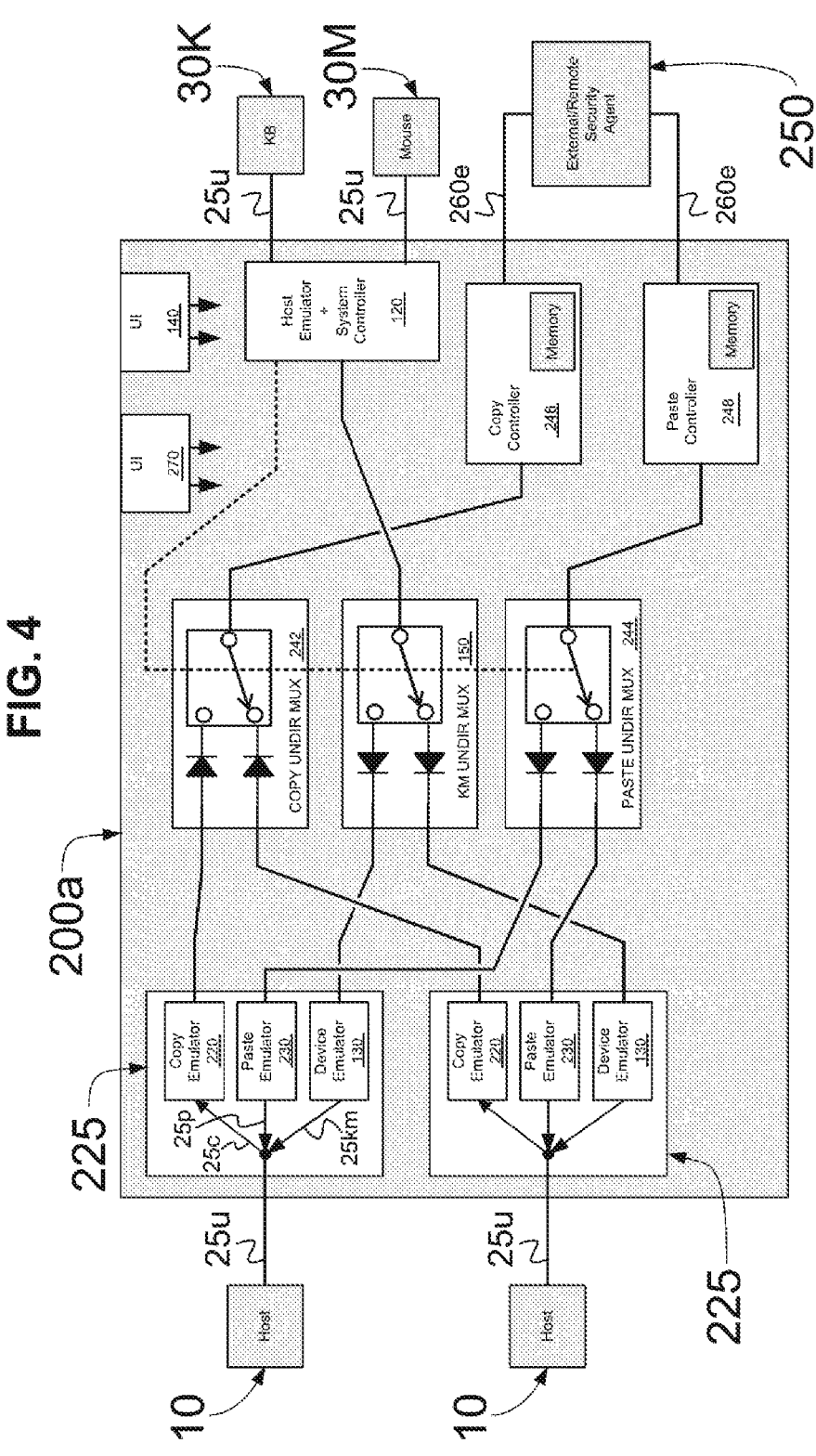

Reference is now made to FIG. 4. FIG. 4 is a schematic block diagram of an embodiment of a secure copy-paste peripheral sharing device 200a. The copy-paste functionality is added to a two port (two hosts) secured KM switch peripheral sharing device. Device 200a is connected to two hosts 10 and from the console side to keyboard 30K and mouse 30M. Device 200a is a secure KM switch comprising device emulators 130 that emulate the keyboard and mouse and host emulator 120 emulate the host in front of the keyboard 30K and mouse 30M to maintain isolation between hosts 10, the keyboard and the mouse data are going through KM UNIDIR MUX 150 that enforce unidirectional data flow from the keyboard and mouse only to the active host. Host emulator 120 is connected to the keyboard via USB communication protocol 25u and to the mouse via another USB communication protocol 25u. Host emulator 120 combine the two data streams to one data stream that is transmitted to the device emulator 130 of the active host. Device emulator 130 is implemented as part of emulator 225. Emulator 225 is connected to host 10 via a single USB connection 25u. Over this single USB cable connection, device emulator 130 uses two composite USB devices, the keyboard and the mouse. Keyboard and mouse data 25km transferred between device emulator 130 and host 10 are multiplexed into USB communication protocol 25u. In addition, copy data 25c is multiplexed into USB communication protocol 25u by the copy emulator 220 composite device, and paste data 25p is multiplexed into USB communication protocol 25u by the paste emulator 230 composite device. Overall, device 200a is connected with each host by a single USB connection and enumerate as a plurality of composite USB devices.

Host emulator 120 also function as the system controller. System controller 120 receives instructions from KM switch UI 140. For example, switch UI 140 may comprise active host selection buttons that send instruction to system controller to switch between the hosts. Switching active host is done by controlling KM UNIDIR MUX 150. Note that switching KM UNIDIR MUX 150 trigger simultaneous switching of units 242 and 244. To summaries, the peripheral sharing device circuitries 110 in this exemplary embodiment comprises elements 120, 130, 140, and 150.

The copy-paste circuitries of secure copy-paste peripheral sharing device 200a comprise the copy emulators 220 and paste emulators 230 which described above. The security bridge in this embodiment comprises elements 242, 244, 246 and 248. Copy emulator 220 transfer the copy-paste object from an active host 10 to the copy controller 246 through COPY UNDIR MUX 242. Copy controller 246 may comprise memory, internal or external, volatile or non-volatile, to store the copy-paste object. COPY UNDIR MUX 242 comprises a switch and two unidirectional enforcing elements, i.e., data diodes, that isolate between the hosts and do not allow transferring of data between copy emulators 220 of different hosts. Note that even in the case the data is stored in the copy controller 246 the data diodes in UNDIR MUX 242 prevent any data leakage between the copy emulators 220.

Copy controller 246 may process the copy-paste object, perform some security functions such as filters out some of the copy-paste objects, add metadata such as which host is the origin of the copy-paste object, a time stamp and the like. Copy controller may transfer the copy-paste object towards the paste controller 248 through communication link 260, in this embodiment, an Ethernet communication protocol 260e. The copy-paste objects may go through additional security processing by external/remote security agent 250 and conditionally upon passing security policy rules sent back to paste controller 248 through another Ethernet communication protocol 260e port. Alternatively, Ethernet communication cable may be connected directly between 260e ports to bypass external/remote security processing. Security policy may be set by a pre-defined allowed destinations (addresses or port numbers) and predefined type of clipboard objects (strings, files, and the like). Paste controller 248 may have internal or external, volatile or non-volatile, memory to store the received copy-paste object.

In an exemplary embodiment of the invention, copy controller 246 and paste controller 248 may be integrated to a single controller.

In an exemplary embodiment of the invention, a single Ethernet communication protocol 260e port may be provided for both sending and receiving the copy-paste objects to/from external/remote security agent 250.

Copy controller 246 may be implemented using a microcontroller and support various type of clipboard from different operating systems such as Windows, Linux, MacOS and Android. Copy controller 246 may convert clipboard objects from one operating system format to another operating system format. Copy controller 246 may receive a unique security policy per-channel and pass only clipboard object that obey this security policy. Copy controller 246 may add metadata such as the channel information that may be provided by the system controller 120.

In an exemplary embodiment of the invention, paste controller 248 may be implemented using a microcontroller and support various type of clipboard from different operating systems such as Windows, Linux, MacOS and Android. Paste controller 248 may get clipboard objects from the external/remote security agent 250. The clipboard objects may be encrypted, may transport using IPSEC tunneling protocol, VPN or the like. Paste controller 248 may paste the clipboard object only for allowed hosts determined by security policy and/or metadata added to the clipboard object. Paste controller 248 may log and/or report status of paste operations. Paste controller 248 may work independently from the peripheral switch and send the clipboard object to copy-paste driver 210 even when the host is not the active host, i.e., the peripheral switch is connected to a different host. Paste controller 248 may prevent channel switching in various cases, e.g., during large file pasting. In case of copy-paste rejection event, paste controller 248 may send message with rejection reason to copy-paste driver 210, and the driver may present this message to the user using host's display.

External/remote security agent 250 may be a stand-alone device located in proximity to secure copy-paste peripheral sharing device 200a. Alternatively, external/remote security agent 250 may be a remote device reside remotely and connected to the LAN or reside remotely over the cloud. External/remote security agent 250 may use a single server or be implemented virtually over a server farm. In order to increase the security of communication 260e, communication 260e may be implemented by tunneling the data with one or more VPN connections.

Paste controller 248 may provide additional security processing, for example if the copy-paste object is provided with time tag paste controller 248 may discard copy-paste objects that exceed a time interval limit between copy operation and paste operation. Paste controller 248 may transfer the copy-paste object to the current active paste emulator through PASTE UNIDIOR MUX 244. PASTE UNIDIOR MUX 244 comprises a switch to direct the data to the active host and a unidirectional data enforcing element that isolate between paste emulators 230 of different hosts. Whenever paste emulator 230 receives copy-paste object, paste emulator 230 may transfer the copy-paste object to the corresponding secure copy-paste driver 210 in host 10. Secure copy-paste driver 210 may notify and/or transfer the received copy-paste object to the clipboard, and whenever the user selects a valid target location and performs paste operation on the running application, the clipboard will be paste in to this location by the running application.

In an exemplary embodiment of the invention, upon completion of the transition of the copy-paste object to the clipboard, copy-paste driver 210 notify the paste emulator 230 so that paste emulator 230 may indicate the user directly or through UI 270 that the copy-paste object is ready in the clipboard for pasting in the host. Optionally or alternatively, the copy-paste driver 210 may indicate the user using host 10 user interface capabilities, e.g., the display.

Secure copy-paste peripheral sharing device 200a further comprises secure copy-paste User Interface (UI) 270. UI 270 may be connected to the relevant circuit elements directly or through system controller 120. UI 270 may comprise one or more buttons to trigger secure inter-computer copy-paste operation as will be discussed later on. UI 270 may comprise indicators to indicate the user on the progress of copy-paste operations, such as, whenever (1) copy-paste object is fully received from the source host to secure copy-paste peripheral sharing device 200a, (2) the clipboard object is fully pass through the security bridge, (3) is ready for paste in the target host, and the like.

In an exemplary embodiment of the invention, when a copy-paste operation is expected to take long time, e.g., using a remote security agent or copy-paste long files, the user may continue working with another host using Secure copy-paste peripheral sharing device 200 during copy-paste operation processing. Alternatively, in some cases, the secure copy-paste peripheral sharing device 200 may prevent the switching of active host until the current copy-paste operation is completed.

In an exemplary embodiment of the invention, the secure copy-paste peripheral sharing device 200 ensure that after clipboard object transfer completion from one element to another element the clipboard object will not be stored in more than one storage element.

In an exemplary embodiment of the invention, there is provided a user interface to abort copy-paste operation, for example if the copy-paste operation takes too much time. Additionally, a UI in secure copy-paste peripheral sharing device 200 or Host 10 through the copy-paste driver 210 may provide graphic indication that show progress or time to complete the copy-paste operation.

It should be noted, that for the sake of clarity and brevity, the embodiment of FIG. 4 as well as the embodiment provided in FIG. 5-FIG. 7 later on are provided with just two hosts and minimal peripheral devices in the console, i.e., only keyboard and mouse but the concepts, circuits, functions and the like, may be easily extended by those skilled in the art to any number of host and any number of consoles and/or any types of peripheral devices.

Figure 5:
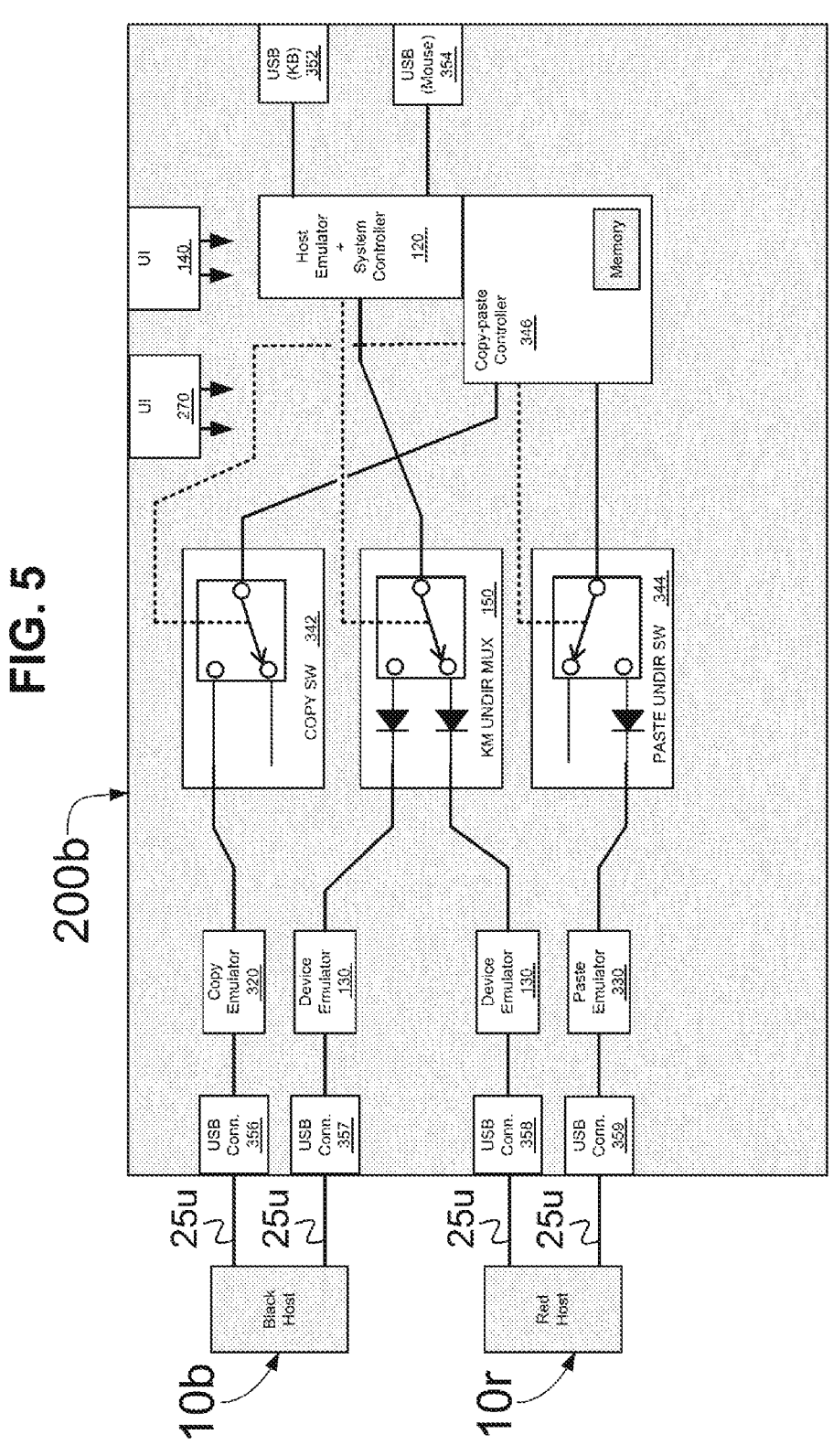

Reference is now made to FIG. 5. FIG. 5 is a schematic block diagram of another embodiment of secure copy-paste peripheral sharing device 200b implemented together with a two port KM switch peripheral sharing device. While all circuitries of the KM switch (120, 130, 140 and 150) remain the same, the keyboard and the mouse were removed from the figure and the USB connectors 352 and 354 in device 200b enclosure, were added for the sake of providing additional details of device 200b implementation and internal hardware description. The secure cut-and-paste circuitries, in this embodiment, are designed to provide more limited copy-and-paste functionality but with increased security against cyber-attacks hence reduce the device vulnerabilities. In this embodiment, the communication protocols 25u of the keyboard and the mouse data and the communication protocols 25u for the copy-paste data are separated. The copy emulator 320 is separated from device emulator 130 and similarly paste emulator 330 is separated from the other device emulator 130. Each one of these emulators is running on a different processor which enhance the security of secure copy-paste peripheral sharing device 200b. The copy-paste functionality in this embodiment is limited only to copy the clipboard from host 10b and to paste it to host 10r. Host 10b, referred herein as the black host, is the non-classified or less secured host, sometimes may be connected to the Internet. Host 10r, referred herein as the red host, is the more classified host, sometimes connected to the classified network of the organization.

Each host is connected to secure copy-paste peripheral sharing device 200b by two USB communication protocols 25u. USB connector 356 connects black host 10b to copy emulator 320. USB connector 357 connects black host 10b to device emulator 130. USB connector 358 connects red host 10r to device emulator 130. USB connector 359 connects red host 10r to paste emulator 220.

As can be seen in FIG. 5, by limiting to copy only operations from host 10b, secure copy-paste peripheral sharing device 200b is no longer need paste emulator for host 10b and copy emulator for host 10r. Copy-paste UNIDIR MUXES 242 and 244 are replaced by COPY SW 342 and PASTE UNIDIR SW 344 that provide enhanced security in this embodiment as will be explained next.

The separated copy-controller 246 and paste controller 248 are replaced with a single copy-paste controller 346. In general, unifying several functions under a single controller might reduce the cybersecurity of the secure copy-paste peripheral sharing device, however, in this case, this risk is minimal. In all embodiments herein of this invention, unifying functions in a single unit/emulator/controller and distributing functions between several units/emulators/controllers is a possible architecture under this invention that, in general provide tradeoffs between cybersecurity vulnerabilities and cost/simplicity. To enhance the security of some aspects of cybersecurity vulnerability, one might implement some elements, such as controllers, that are typically implemented by programable micro-controllers, with ICs, such as FPGA, or even non-programable digital logic circuitry. For example, in this embodiment copy-paste controller may be non-programable controller that connected directly to UI 270 so that copy switch 342 will only connect to copy emulator 320 when the user selects, by pushing a button on UI 270, to perform copy operation. Switch 342 will be open again after the clipboard object will be transferred to the memory in copy-paste controller 346. PASTE UNIDIR SW 344 will connect to the paste emulator only to perform paste operation. Optionally, after copy-paste controller 346 transfer the copy-paste object to paste emulator 330, copy-paste object will be deleted from copy-paste controller 346 memory.

In an exemplary embodiment of the invention, copy-paste controller 346, host emulator and system controller 120 are implemented in a single micro-controller. Although this implementation is a bit less secure, the data diode in PASTE UNIDIR SW 344 prevent any data transfer from red host 10r to the system controller 120 even if this controller is hacked by malicious code.

In an exemplary embodiment of the invention, to avoid leakage of data from highly secured hosts the peripheral sharing device does not have a copy emulator for the secured hosts and the paste emulator is connected to a data diode to prevent any possibility of data flow from the paste emulator to the other parts of the peripheral sharing device and the other hosts.

In an exemplary embodiment of the invention, copy-paste controller 346, limit the copy-paste object to only a text string. Optionally, copy-paste controller 346 may limit the length of copy-paste to a predefined number of characters, e.g., tens, hundreds or any number up to 64K of characters. Optionally, copy-paste controller 346 may limit the characters in the text string to only Latin characters, only digits, and the like.

In an exemplary embodiment of the invention, copy-paste operation may not be performed without a trigger activation by the user with the aid of UI 270. This activation may not be bypassed by any programable element in secure copy-paste peripheral sharing device 200b.

Figure 6:
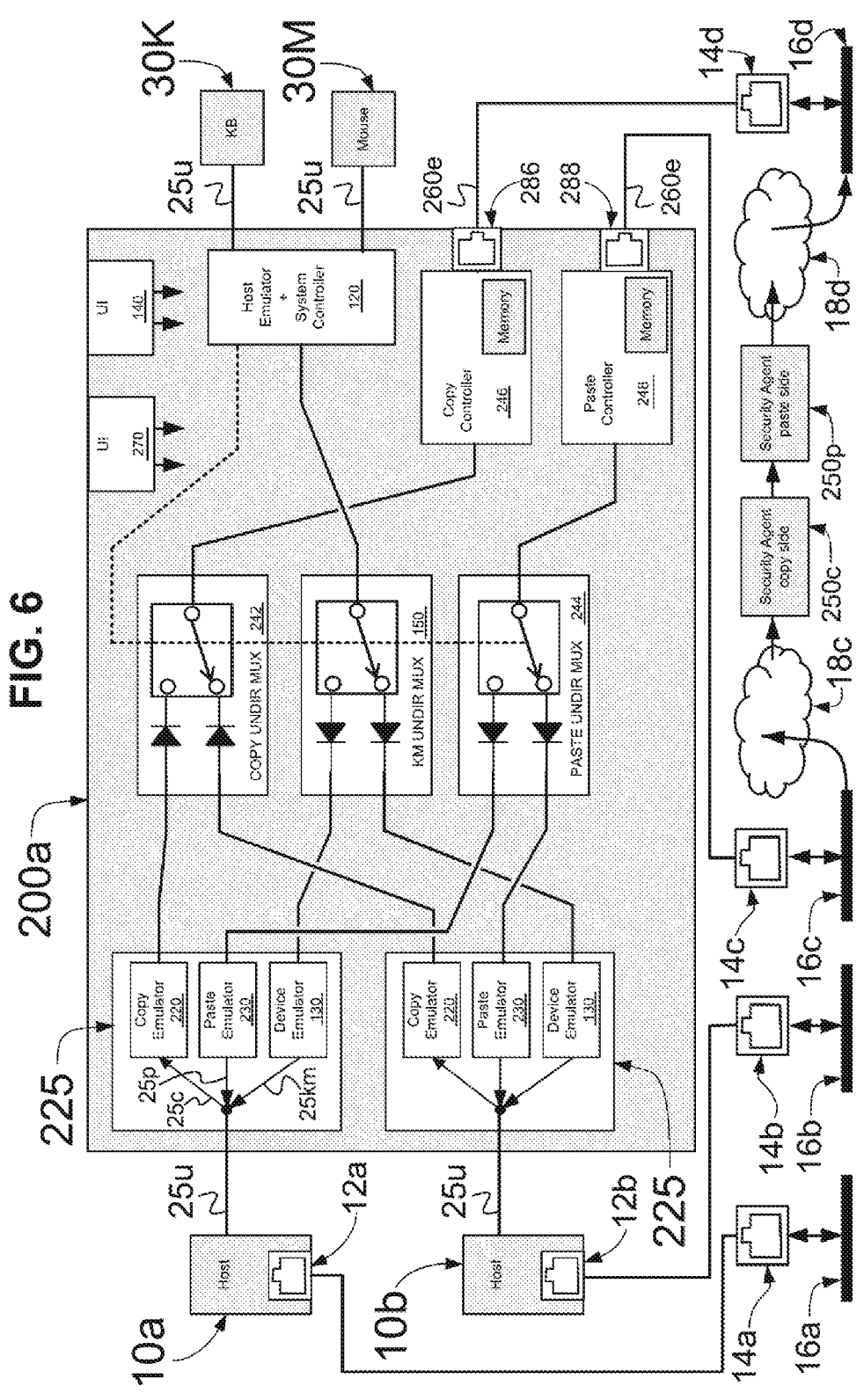

Reference is now made to FIG. 6. FIG. 6 is a schematic block diagram of the embodiment in FIG. 4 (device 200a) with a focus on the network communication channels of the full system. Host 10a and 10b have each an RJ45 Ethernet socket connector 12a and 12b respectively. In some implementation, the hosts 10a and 10b may be connected using cables, e.g., category 5 (CAT5) cables, to a RJ45 Ethernet sockets connectors 14a and 14b respectively. Sockets connectors 14a and 14b may be located on the office walls and are connected through the building communication infrastructure to switches that establish Local area networks (LANs) 16a and 16b. In some installations LAN 16a may be the less secured network while LAN 16b may be the more secured network, such as a classified network, a secret network, a "red" network or the like.

Secure copy-paste peripheral sharing device 200a may have RJ45 Ethernet socket connector 286 to communicate between copy controller 246 and external/remote security agent 250. In an exemplary embodiment of the invention, copy controller 246 may be connected using CAT5 cable to RJ45 Ethernet sockets connector 14c located on the office's wall as well. Connector 14c is connected to LAN 16c. LAN 16c may be connected via a router to a wide area network (WAN) or local area networks (LAN), such as the Internet or organization private internet, in any of these cases represented in the figure by cloud 18c. Copy side 250c of external/remote security agent 250 is connected to cloud 18c as well. In this exemplary configuration, external/remote security agent 250 may have a paste side 250p of external/remote security agent 250. Paste side 250p of external/remote security agent 250 may be connected to a different cloud 18d. Cloud 18d may be WAN, organization private LAN, internet or the Internet. LAN 16d may be connected to cloud 18d. LAN 16d may have RJ45 Ethernet sockets connector 14d connector that may be located in the office's wall that device 200a is deployed in. Using CAT5 cable, connecting between RJ45 Ethernet sockets connector 14d and connector 286, LAN 16d may be connected to paste controller 248.

In an exemplary embodiment of the invention, LAN 16c may be a more secure LAN connected to the internal classified cloud 18c of an organization, while LAN 18d may be a less secure LAN connected to the Internal. Any combination of classification order may be set for LANs 16a, 16b, 16c and 16d, or in general for other LANs ports of the secure copy-paste peripheral sharing device 200 if device 200 support more than two hosts.

In an exemplary embodiment of the invention, copy side 250c of external/remote security agent 250 and paste side 250p of external/remote security agent 250 are connected using a unidirectional enforcing communication link so that only data from copy side 250c can be transmitted to paste side 250p. Alternatively, the copy side 250c and paste side 250p are located remotely and connected using WAN or the Internet. External/remote security agent 250 may have one communication port that is dedicated to a more secured data and hence connected to higher security network/cloud and one communication port that is dedicated to a less secured data and hance connected to lower security network/cloud.

In an exemplary embodiment of the invention, a single external/remote security agent 250 may provide copy-paste security services for a plurality of secure copy-paste peripheral sharing devices 200. Optionally, a single external/remote security agent 250 may provide copy-paste security services for all secure copy-paste peripheral sharing device 200 in an organization.

In the embodiment described in FIG. 6, the network infrastructure of the building needs to support four LAN ports to the room in which device 200a is deployed. In many cases, the infrastructure in the building support only two network ports, for example: (1) a less secured network, e.g., "black", connected to the Internet, network, and (2) a more secured network, e.g., "red", connected to the classified organization network. A cost-effective secure copy-paste peripheral sharing device for this case is presented next.

In an exemplary embodiment of the invention, the networking connectors are other than RJ45 Ethernet socket connectors, such as USB type C connectors, Firewire connectors, Thunderbolt connectors or the like.

Figure 7:
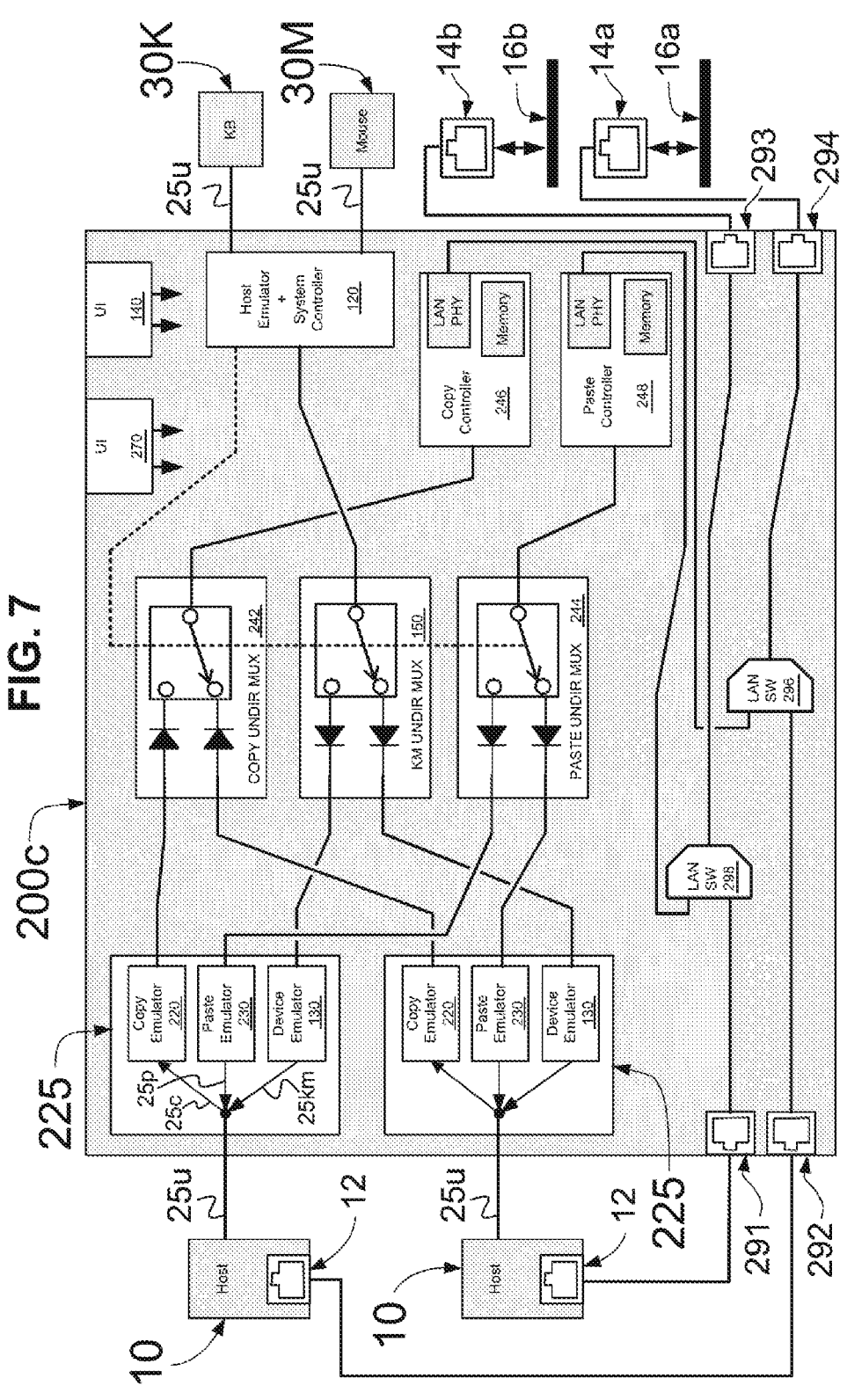

Reference is now made to FIG. 7. FIG. 7 is a schematic block diagram of an embodiment of secure copy-paste peripheral sharing device 200a integrating LAN switches to reduce the required number of LAN ports. As in FIG. 6, there are RJ45 Ethernet sockets connectors 14a and 14b located on the office walls and connected through the building communication infrastructure to switches that establish LANs 16a and 16b.

In secure copy-paste peripheral sharing device 200c, the copy controller 246 and paste controller 248 are not connected to RJ45 Ethernet sockets connectors in the secure copy-paste peripheral sharing device 200c encloser, but rather, instead, the LAN PHY of copy controller 246 and LAN PHY of paste controller 248 are connected internally to LAN switches 296 and 298 respectively.

LAN switches 296 and 298 maybe Ethernet routers, Ethernet hubs or Ethernet switches. LAN switches 296 and 298 may have all ports be part of the same network or some ports, such as the two left-side ports in the figure, hereinafter refer here as input ports, be part of a first network and the right-side port in the figure, hereinafter refer here as output ports, be part of a second network. It should be noted that these LAN ports are bidirectional and the term input and output are only for the circuitry description convenience of this embodiment. It is appreciated by a person skill in the art that the topology of the LAN routing that is provided here for the sake of simplicity with two host and two routers with two inputs one output may be designed differently based on the number of hosts and the characteristics of the network infrastructure provided in the premises.

In this exemplary embodiment, the second input port of LAN switch 296 is connected to RJ45 Ethernet sockets connector 292. RJ45 Ethernet sockets connector 292 is configured to be connected to one of the LAN ports 12 of one of hosts 10. The second input port of LAN switch 298 is connected to RJ45 Ethernet sockets connector 291. RJ45 Ethernet sockets connector 291 is configured to be connected to one of the LAN ports 12 of another host 10.

The output port of LAN switch 298 is connected to RJ45 Ethernet sockets connector 293. The output port of LAN switch 296 is connected to RJ45 Ethernet sockets connector 294. RJ45 Ethernet sockets connectors 293 and 294 are configured to be connected to the LAN infrastructure of the office, i.e., the console deployment location. In the present example, connectors 293 and 294 are connected to wall's connectors 14b and 14a respectively.

If, for example, the secure policy is to allow only copy from less secure host to a more secure host, and LAN 16b is the less secure network. LAN 16b should be connected to connector 293 and the less secure host should be connected to connector 291. All other combination of connecting the cables between hosts and connectors 291 and 292, as well as connecting the cables between LANs and connectors 293 and 294 are possible conditioned upon the security policy that the secure copy-paste peripheral sharing device 200c is set to. Optionally, LAN switch 296 and 298 may be automatically select the LAN that the copy controller and the paste controller will use, depending at least on the type of the copy-paste operation.

In an exemplary embodiment of the invention, copy controller and paste controller may use different external/ remote security agent 250 for different types of copy-paste operations. For example, text copy-paste operation may be transmitted to one external/remote security agent, while file copy-paste operation may be transmitted to another external/ remote security agent.

In an exemplary embodiment of the invention, one or more LAN switches similar to 296 is 298 are used to support a secure copy-paste peripheral sharing device that support three or more computer hosts 10.

In an exemplary embodiment of the invention, host LAN connectors 291, 292 and the like are color coded and infrastructure LAN connectors 293 and 294 and the like are color coded as well, the LAN switches configuration enforce only connection between the same color-coded host LAN connectors and infrastructure LAN connectors while enable the copy controller 246 and paste controller 248 to be connected to any one of the infrastructure LAN connectors based upon the cut-paste security policy.

Copy-Paste Triggering, Procedures and User
Interface Issues

The triggering of the inter-computer copy operation may be one of the follows:

(1) a regular host computer copy-operation activation that can be triggered by any standard user interface operation of the host computer, such as, menu driven copy function selection, Control-C keyboard shortcut activation on the keyboard or the like;

(2) a special user interface inter-computer copy operation activation on the host computer, such as new upgraded user interface installed by the secure copy-paste drivers 210 during the driver installation and/or start-up procedure, such an interface may be new items in the menus offer an intra-computer copy operation;

(3) a special shortcut activation on the keyboard, e.g., Control-Alt-C keyboard shortcut;

(4) a trigger generated by the UI 270 of secure copy-paste peripheral sharing device, such as pressing a key on the device's panel or the like.

The triggering of the inter-computer paste operation may be one of the follows:

(1) a regular host computer paste-operation activation that can be triggered by any standard user interface operation of the host computer, such as, menu driven paste function selection, Control-V keyboard shortcut activation on the keyboard or the like;

(2) a special user interface inter-computer copy operation activation on the host computer, such as new upgraded user interface installed by the secure copy-paste drivers 210 during the driver installation and/or start-up procedure, such an interface may be new items in the menus offer an intra-computer paste operation;

(3) a special shortcut activation on the keyboard, e.g., Control-Alt-V keyboard shortcut;

(4) a trigger generated by the UI of secure copy-paste peripheral sharing device, such as pressing a key on the device's panel or the like.

A straight forward option is to use the standard copy-paste UI on the hosts to trigger and execute the inter-compute cut and paste operations. In this case, no UI elements 270 is needed in the secure copy-paste peripheral sharing device 200. When a user in host 10 select copy operation the secure copy-paste drivers 210 in host 10 get a notification and if the host is an active host of the secure copy-paste peripheral sharing device, secure copy-paste driver 210 sends the clipboard to the corresponding copy emulator 220. Copy emulator 220 may wait for the host being deactivated then send the clipboard content to the security bridge 240. Alternatively, copy emulator 220 may send the clipboard content to the security bridge 240 immediately. Security bridge 240 after applying the security policy may send immediately the clipboard content to all paste emulators 230 or wait for a switch of the active host then send the clipboard to the paste emulator 230 corresponding to the switched recently active host. As soon as paste emulator 230 gets a clipboard object and, optionally, the corresponding host is an active host of the secure copy-paste peripheral sharing device, this paste emulator 230 may send the clipboard object to the corresponding copy-paste driver 210. Upon receiving the clipboard object, copy-paste driver 210 transfers the clipboard object to the clipboard of this host. When the user in this current active host 10, which is different than the previous active host, triggers paste operation, the content of this clipboard object is pasted to the active application in this current active host.

From the user perspective the above operation is very straight forward. Defining previous active host as host #1 and current active host as host #2, when the user is working with host #1, the user selects, for example, a text in Word application running on host #1, press Control-C shortcut on the keyboard, switch in the peripheral sharing device to have host #2 as the active host, select the location to paste in the Word application running on host #2, then press Control-C shortcut on the keyboard. The final result is that the selected text in Word application in host #1 is copied to the selected location in Word application running on host #2.

Note that in this simple operation, if the user press Control-V shortcut while host #1 is active i.e., the keyboard is connected to host, the copy-paste operation will be intra-computer operation, and if the user press Control-C shortcut while host #2 is active i.e., the keyboard is connected to host #2, before pressing Control-V shortcut, the new clipboard object will be paste, i.e., the copy-paste operation is intra computer operation as well.

While this simple embodiment may be used as secure cut-paste implementation, it poses some disadvantages. First, it is less secure to transfer through the system clipboard objects that are not intended to eventually be pasted in another computer. Second, the inherent delay of inter computer cut-past operation may require synchronization with the user. In some situations, such as triggering paste operation too early, some malfunctions may occur if proper complex lock operations across multiple host dipboards are not taken.

Alternative approach is to implement a special triggering method to inter-computer copy-paste operation. In this case, the inter-computer copy operation trigger may ensure that the clipboard object is immediately transferred to the secure copy-paste driver 210 and the standard clipboard object may be deleted on the copy side host. The inter-computer past operation trigger may ensure that only clipboard object from the secure copy-paste peripheral sharing device 200 paste to the application.

In an exemplary embodiment of the invention, a single trigger operation may perform the full copy-paste operation as will be discussed later on.

In another approach, it is possible to combine both normal cut-paste operation triggers on the hosts with additional cut-paste operation triggers in the secure copy-paste peripheral sharing device 200.

Figure 8:
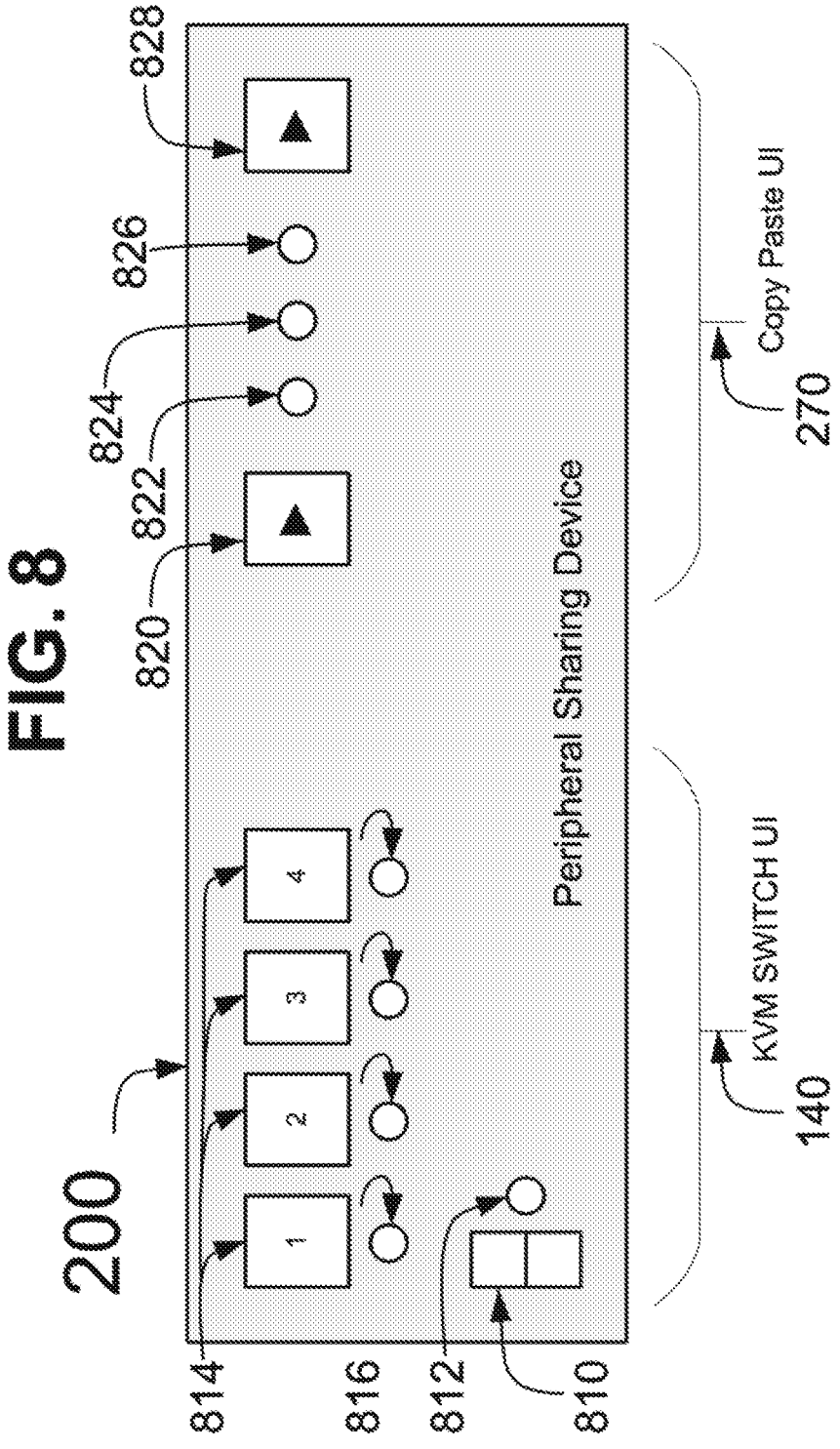

Reference is now made to FIG. 8. FIG. 8 is an illustration of an exemplary embodiment of secure copy-paste peripheral sharing device 200 having a panel for copy-paste UI 270 and peripheral sharing device UI 140. Secure copy-paste peripheral sharing device 200 is, in this exemplary embodiment, a KVM switch supporting four hosts, knowing also, as four ports or four channels KVM switch. FIG. 8 illustrates the front panel of secure copy-paste peripheral sharing device 200. The front panel comprises buttons and indicators, e.g., LEDs. The back panel (not shown) comprises all ports/connectors for connecting the device 200 to hosts 10 and console 50.

Peripheral sharing device UI 140 comprises on-off power switch 810 and power indication LED 812 as well as four push buttons 814 and four host indicators 816. The four push buttons 814 are used to select the active host. Pressing each one of the buttons (labelled 1 to 4 to indicate host number 1 to 4) trigger switching to the corresponding host. The active host is indicated by indicators 816. Active host indicator 816 is illuminated when the corresponding host is active.

Copy-paste UI 270 comprises two push buttons 820 and 828 and three indicators 822, 824 and 826. The copy-paste operation starts when the user activates copy operation on the active host. Next the user presses copy push button 820. Upon completion of copying the clipboard object to the corresponding copy emulator 220 indicator 822 illuminates, e.g., by green color. Immediately after, indicator 824 begin blinking with red color. When the user switch to another channel (another host become active) indicator 824 illuminates in blinking orange to indicate the stage of security processing. Blinking green might indicate that the clipboard object had been successfully sent to the remote security agent 250. When the clipboard object to be pasted successfully received back from the remote security agent 250, indicator 824 may illuminate in continuous stable green color. When the clipboard object received by the corresponding paste emulator 230, indicator 826 may illuminate in green color. If at this stage the active host is not the host that allowed to carry the paste operation, indicator 826 may blink in orange color and the device wait for the user to switch the proper host. Once the KVM switch is set to the proper channel (allowed for paste channel) the user may push the paste push-button 828 and the content will transfer to the corresponding copy-paste driver 210 and then loaded to the host clipboard. At that stage indicator 826 may illuminate in continuous stable green color. The user may then paste the content. Optionally, after the paste operation on the host completed, copy-paste driver 210 may delete the host clipboard and communicate the completion of the paste operation causing all indicators (822, 824 and 826) lights to switched off.

In case of errors, security issues and the like, indicators 822, 824 and 826 may illuminate in steady or blink red, orange or anther color to indicate the type of error.

In an exemplary embodiment of the invention, another reset button is provided to flush clipboard object from all elements and memories and set all copy-paste elements and functions in to their initial state.

Figure 9:
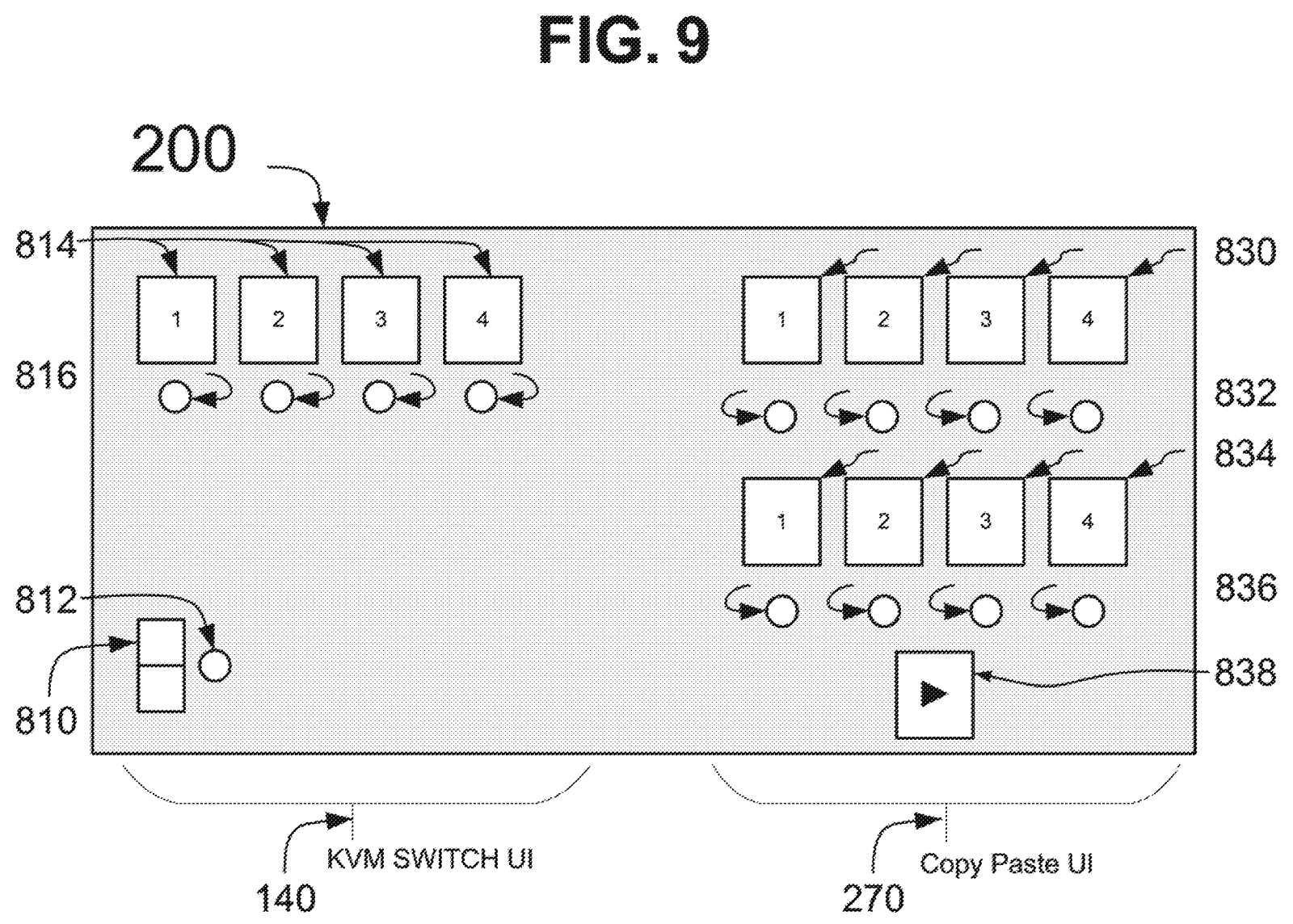

Reference is now made to FIG. 9. FIG. 9 is an illustration of an exemplary embodiment of secure copy-paste peripheral sharing device 200 having another version of front panel with different copy-paste UI 270. The user interface 270 comprises four copy operation channel selection push buttons 830, four copy indicator 832, four paste operation channel selection push buttons 834, four paste indicators 836, and one copy-paste trigger push buttons 834. To start secure cut-and paste operation the user selects the copy channel by selecting one of the four copy operation channel selection push buttons 830. At first press, secure copy-paste peripheral sharing device 200 makes this host active so the user can select the object to be copied. The corresponding indicator 832 then blink. Next, the user selects the paste channel by selecting one of the four paste operation channel selection push buttons 834. In response, device 200 makes this host active so the user can select the location of the paste in the target host. The corresponding indicator 836 then blinks. In the last step, the user presses push button 838 to trigger the copy-paste operation. The clipboard is copied from source host without any other operation from the user. To indicate the completion of this task the corresponding indicator 832 stops blinking and illuminates continuously. Then, upon completion of the paste operation, indicator 836 stops blinking and illuminates momentarily to indicate that the copy-paste operation is complete. After copy-paste operation is complete all indicators turn off and device 200 go back to its normal operation.

In some modes of operation, clipboard cut-and past triggering are not performed by the user and copy-paste drivers 210 are performing some of the tasks automatically including optionally flushing the clipboard so the inter-computer copy-paste operation is totally separated from the intra computer cut-and paste operations.

It is appreciated that the examples given above are only exemplary embodiment and many combinations, subcombinations and modifications of: triggering, indications, host clipboard interaction with the copy-paste drivers 210, steps of performing the data transfer between the elements of secure copy-paste peripheral sharing device 200 and the like, will be apparent to those skilled in the art.

In an exemplary embodiment of the invention, copy-paste operation is operated independently from the active host selection of the peripheral sharing functionality of secure copy-paste peripheral sharing device 200.

In an exemplary embodiment of the invention, secure copy-paste peripheral sharing device comprises one or more displays and the device may inject over one of the video streams (by On Screen Display-OSD) information regarding the copy-paste operation status. Optionally or alternatively, the device presents information regarding the copy-paste operation status over its own display or a display on the device remote controller.

In an exemplary embodiment of the invention, secure policy is local and stored in the secure copy-paste peripheral sharing device 200. Additionally or alternatively, secure policy is global and enforced by the external/remote security agent 250.

Security Policy Processing Issues

The cybersecurity attacks prevention measures may be implemented in partial or in full in any one of the elements in the system: starting from the copy-paste driver on the copy-side computer, continue with the copy emulator, the security bridge, the external/remote security agent, the paste emulator and finally, back again to the copy-paste driver on the paste-side computer. Alternatively, cyber-security attacks prevention measures may be provided solely in the security bridge 240 and, if provided, in external/remote security agent 250.

There are many types of measures and processing tasks that may be implemented. A non-programable, non-by-passed, unidirectional enforcing element that physically enforces only one direction of data flow is one of the more effective measure to combat cyber-security attacks. Other measures may include variety of filtering, such as filtering that allowing only specific type of clipboard object, e.g., only short text string, filtering only specific type of files and the like. In some cases, filtering may be with white/black list logic, for example, the external/remote security agent may have a database of unallowed text strings, such as, "confidential", "classified", code names and the like, and if the clipboard contains such an unallowed string the copy-paste operation will be prohibited.

In some cases, the clipboard object may be processed and converted. For example, a pdf document may be virtually printed and then scanned back to a pdf document to clear all metadata contained in the original pdf document. Some information, such as pictures, video, audio may be degraded in resolution and deliberately blurred to prevent hidden information that might be imprinted in the original object In any step in the copy-paste pathway security policy roles might be checked. Policy rules may include information regarding which host is allowed to generate what type of clipboard object, which host is allowed to receive what type of clipboard object, clipboard size and copy-paste bandwidth limitations, time limitation and the like. For example, a policy rule may restrict the copy-paste operation will be allowed only during working hours, e.g., between 8:00 am to 5:00 pm and only in Monday to Thursday.

To provide better tracking on the copy-paste operations, copy controller may add metadata to the clipboard object that comprises creation time, creation source (the ID of the host), the ID of the secure copy-paste peripheral sharing device, and the like. This data may be processed and used for example to limit the copy-paste operation done every hour or every day or any every other time frame.

Security processing may include aggregation of info and metadata of the copy-paste operation in order to identify malfunctioning, security breach or any other cyber-security events. To identify such event numerous AI technics can be used including deep neural networks (DNN), clustering and machine learning technics. In an exemplary embodiment of the invention, the AI software might learn and build profile for the pattern of use for copy-paste operation for each user, and a deviation from that pattern for any of the user may trigger security event notification.

The copy-paste operation may be logged and archived for periodic investigation or forensic analysis.

It is to be understood that the invention is not necessarily limited in its application to the details of the exemplary smartphone and/or methods set forth in the following description and/or illustrated in the drawings is capable of embodied in other embodiments or of being practiced or carried out in various types of smartphones.

It is expected that during the life of a patent maturing from this application many relevant antenna couplers will be developed and the scope of the term antenna coupler is intended to include all such new technologies a priori.

The terms "comprises", "comprising", "includes", "including", "having" and their conjugates mean "including but not limited to".

As used herein, the singular form "a", "an" and "the" include plural references unless the context dearly dictates otherwise.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A peripheral sharing device for supporting secure copy-paste operations between hosts, comprising:

a plurality of copy emulators and a plurality of paste emulators, each one of the copy emulators and each one of the paste emulators is configured to be connected to a single copy-paste driver of one of the hosts, wherein each one of the copy-paste drivers is running on one of the plurality of hosts, each one of the hosts is connected to the peripheral sharing device, and each one of the copy-paste drivers is configured to fetch or store clipboard objects from a clipboard of the corresponding host; and a security bridge that is configured to securely pass the clipboard objects between pairs of one of the copy emulators and one of the paste emulators, wherein the security bridge performs one or more of (1) enforcing unidirectional data transfer of the clipboard objects, (2) monitoring the clipboard objects and enabling or disabling any one of the copy-paste operations according to a security policy, (3) enabling or disabling only one of the copy-paste operations according to the security policy comprising from at least the identity of source host, the identity of the target host, the type of the clipboard object, time delays and time of day of the copy-paste operation, (4) modifying the clipboard object to prevent sensitive data leakage, (5) building a profile of copy-paste operation patterns of users, (6) analyzing clipboard object traffic to detect cyber-security events, (7) logging, auditing and archiving copy-paste operations or clipboard object traffic history, (8) scanning virus existence in the clipboard objects, (9) sanitizing or removing some information from the clipboard objects,

(10) encrypting and decrypting of the clipboard objects,

(11) locking suspicious peripheral sharing devices, and

(12) preventing clipboard object transfer between pairs of copy-paste controllers according to security rules, wherein the copy emulator that receives the clipboard object from a source host's copy-paste driver transfers the clipboard object to the security bridge, and conditioned upon passing security conditions, the security bridge transfers the clipboard object to one of the paste emulators that further passes the clipboard object to a target host's copy-paste driver, and wherein the peripheral sharing device couples the hosts to one or more user's consoles, wherein the user's consoles comprise one or more peripheral devices, wherein the peripheral sharing device enables each one of the users to operate the hosts using a single console, and wherein the peripheral sharing device is a secure peripheral sharing device that isolates communication and data between pairs of one console and one host from all other hosts and all other consoles while preventing any data transfer or communication between hosts and permitting only limited copy-paste operations allowed by the security policy.

2. The peripheral sharing device of claim 1, wherein security bridge further comprises one or more copy controllers and one or more paste controllers, each one of the copy controllers is configured to be connected to one or more copy emulators, and each one of the paste controllers is configured to be connected to one or more paste emulators, wherein the copy controllers are coupled to the paste controller through a security agent to provide one or more pairs of copy-and-paste controllers, and the security bridge is further configured to perform security functions from at least one of or any combination of (1) enforcing unidirectional communication between the pairs of copy-and-paste controllers, (2) authenticating the pairs of copy-and-paste controllers, (3) blocking or filtering out undesired data transmission between the pairs of copy-and-paste controllers, (4) blocking, locking, neutralizing or stopping the communication between the pairs of copy-and-paste controllers, (5) encrypting and decrypting the communication between the pairs of copy-and-paste controllers, (6) logging, auditing or alerting clipboard transfer events, (7) auditing the clipboard context of clipboard transfer events, (8) analyzing the context of clipboard transfer events, (9) preventing data transfer between the pairs of copy-and-paste controllers according to security rules,

(10) preventing signal leakage between different pairs of copy-and-paste controllers,

(11) allowing passage of only specific types of clipboard object types,

(12) scanning for viruses and malicious codes in files/objects clipboards,

(13) isolating the communication between the pairs of copy-and-paste controllers,

(14) allowing only specific copy-and-paste usage, and

(15) using Artificial Intelligence (AI) processing to detect suspicious pattern of copy-paste operations.

3. The peripheral sharing device of claim 1, wherein the clipboard object received by the target host is modified version of the clipboard object transferred by the source host.

4. The peripheral sharing device of claim 1, wherein the security bridge further comprises an external/remote security agent attached to the peripheral sharing device and the external/remote security agent is a local external device connected to the peripheral sharing device or a remote device or server connected to the peripheral sharing device using a data network comprising from at least an intranet or the Internet.

5. The peripheral sharing device of claim 1, wherein the peripheral sharing device is configured to communicate with an external/remote security agent via one or more Ethernet ports.

6. The peripheral sharing device of claim 4, wherein communication with the external/remote security agent is performed using Virtual Private Network (VPN) or Internet Protocol Security (IPSEC) tunneling protocols.

7. The peripheral sharing device of claim 1, wherein the security bridge comprises a copy controller communicating with the one or more copy emulators and a paste controller communicating with the one or more paste emulators.

8. The peripheral sharing device of claim 1, wherein the peripheral sharing device comprises at least one unidirectional enforcing device that enables only copy operations and blocks all paste operations from a particular host.

9. The peripheral sharing device of claim 1, wherein the peripheral sharing device comprises at least one unidirectional enforcing device that enables only paste operations and blocks all copy operations from a particular subset of all the hosts.

10. The peripheral sharing device of claim 1, wherein the peripheral sharing device comprises one or more memories to store the clipboard objects, and the memories are at least any one of or any combination of: internal memories, add-on memories, external storage devices, volatile memories, non-volatile memories.

11. The peripheral sharing device of claim 1, wherein the peripheral sharing device comprises user interface means to trigger and control the copy-paste operations.

12. The peripheral sharing device of claim 1, wherein the peripheral sharing device is a secure peripheral sharing device.

13. The peripheral sharing device of claim 1, wherein communication between at least one of the copy-paste drivers and at least one of the copy emulators is performed over Universal Serial Bus (USB).

14. The peripheral sharing device of claim 1, wherein communication between at least one of the copy-paste drivers and at least one of the paste emulators is performed over Universal Serial Bus (USB).

15. The peripheral sharing device of claim 1, wherein a keyboard and mouse device emulator, one of the copy emulators, and one of the paste emulators, share the same Universal Serial Bus (USB) port and enumerate as a plurality of composite Universal Serial Bus (USB) devices.

16. The peripheral sharing device of claim 1, wherein the peripheral sharing device further comprises network switches to share data communication of the hosts and the security bridge over one or more external network ports.

17. The peripheral sharing device of claim 1, wherein the clipboard objects comprise at least one of the following types: text string, picture, file, and Object Linking and Embedding (OLE) objects.

18. The peripheral sharing device of claim 1, wherein the peripheral sharing device adds metadata information to the clipboard objects and wherein the metadata information comprises at least one of or any combination of: Time Of Day (TOD) of the copy operation, copy operation host identification (host ID), Time Of Day (TOD) of the paste operation, and paste operation host identification (host ID).

19. The peripheral sharing device of claim 1, wherein the peripheral sharing device comprises a copy-paste User Interface (UI), the copy-paste user interface comprises at least one of or any combination of (1) pushbuttons to trigger the copy-paste operations or steps of the copy-paste operations, and (2) one or more indicators to provide progress and status information to the user regarding the copy-paste operation.

20. The peripheral sharing device of claim 1, wherein the peripheral sharing device captures copy-paste triggering commands from a keyboard data stream.

21. The peripheral sharing device of claim 1, wherein the peripheral sharing device receives copy-paste triggering commands from the host's copy-paste driver.

22. The peripheral sharing device of claim 1, wherein only text string clipboard objects, with length that is less than a predefined maximum length, are allowed to be transferred in the copy-paste operations.

23. A system for secure copy-paste operations between hosts comprising:

a plurality of hosts; and a secure copy-paste peripheral sharing device for supporting secure copy-paste operations between hosts, wherein each host is connected to the secure copy-paste peripheral sharing device and comprises copy-paste driver configured to fetch or store clipboard objects from the clipboard of the host, wherein the secure copy-paste peripheral sharing device includes a plurality of copy emulators and a plurality of paste emulators, each one of the copy emulators and each one of the paste emulators is configured to be connected to one of the host's copy-paste drivers, and a security bridge that is configured to securely pass the clipboard objects between pairs of one of the copy emulators and one of the paste emulators, wherein the security bridge performs at least one of or any combination of (1) enforce unidirectional data transfer of the clipboard objects, (2) monitor the clipboard objects and enable or disable the any one of the copy-paste operations according to a security policy, (3) enable or disable any one of the copy-paste operations according to the security policy comprising from at least the identity of source host, the identity of the target host, the type of the clipboard object, time delays and time of day of the copy-paste operation, (4) modify the clipboard object to prevent sensitive data leakage, (5) build a profile of copy-paste operation patterns of users, (6) analyze clipboard object traffic to detect cybersecurity events, (7) log, audit and archive copy-paste operations or clipboard object traffic history, (8) scan virus existence in the clipboard objects, (9) sanitize or remove some information from the clipboard objects,

(10) encrypt and decrypt of the clipboard objects,

(11) lock suspicious peripheral sharing devices, and

(12) prevent clipboard object transfer between pairs of copy-paste controllers according to security rules, and wherein the copy emulator that receives the clipboard object from a source host's copy-paste driver transfer the clipboard object to the security bridge and conditioned upon passing security conditions, the security bridge transfers the clipboard object to one of the paste emulators that further passes the clipboard object to a target host's copy-paste driver, and wherein the secure copy-paste peripheral sharing device couples the hosts to one or more user's consoles, wherein the user's consoles comprise one or more peripheral devices, wherein the peripheral sharing device enables each one of the users to operate the hosts using a single console, and wherein the secure peripheral sharing device isolates communication and data between pairs of one console and one host from all other hosts and all other consoles while preventing any data transfer or communication between hosts and permitting only limited copy-paste operations allowed by the security policy.

24. A method for performing secure copy-paste operations between hosts through a peripheral sharing device, wherein the peripheral sharing device couples the hosts to one or more user's consoles, wherein the user's consoles comprise one or more peripheral devices, wherein the peripheral sharing device enables each one of the users to operate the hosts using a single console, and wherein the peripheral sharing device is a secure peripheral sharing device that isolates the communication and data between pairs of one console and one host from all other hosts and all other consoles while preventing any data transfer or communication between hosts and permitting only limited copy-paste operations allowed by a security policy, the method comprising the steps of:

receiving a clipboard object from a source host;

transferring the clipboard to a security bridge;

receiving the clipboard from the security bridge; and sending the clipboard to the target host, wherein the security bridge performs at least one of or any combination of (1) enforcing unidirectional data transfer of the clipboard object, (2) monitoring the clipboard object and enabling or disabling the copy-paste operation according to the security policy or a set of security rules, (3) enabling or disabling the copy-paste operation according to the security policy comprising from at least the identity of source host, the identity of the target host, the type of the clipboard object, time delays and time of day of the copy-paste operation, (4) modifying the clipboard object to prevent sensitive data leakage, (5) building a profile of copy-paste operation patterns of users, (6) analyzing clipboard object traffic to detect cyber-security events, (7) logging, auditing and archiving copy-paste operation or clipboard object traffic history, (8) scanning virus existence in clipboard object, (9) sanitizing or removing some information from clipboard objects,

(10) encrypting and decrypting of clipboard objects,

(11) locking suspicious peripheral sharing devices, and

(12) preventing clipboard object transfer between pairs of hosts according to security rules.

* * * * *